United States Patent
Ping et al.

(10) Patent No.: US 11,482,207 B2
(45) Date of Patent: *Oct. 25, 2022

(54) WAVEFORM GENERATION USING END-TO-END TEXT-TO-WAVEFORM SYSTEM

(71) Applicant: Baidu USA, LLC, Sunnyvale, CA (US)

(72) Inventors: Wei Ping, Sunnyvale, CA (US); Kainan Peng, Sunnyvale, CA (US); Jitong Chen, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/129,752

(22) Filed: Dec. 21, 2020

(65) Prior Publication Data

US 2021/0110810 A1    Apr. 15, 2021

Related U.S. Application Data

(63) Continuation of application No. 16/277,919, filed on Feb. 15, 2019, now Pat. No. 10,872,596, which is a
(Continued)

(51) Int. Cl.
*G10L 13/00* (2006.01)
*G10L 13/08* (2013.01)
*G06F 9/30* (2018.01)

(52) U.S. Cl.
CPC .......... *G10L 13/00* (2013.01); *G06F 9/30003* (2013.01); *G10L 13/08* (2013.01)

(58) Field of Classification Search
CPC ..... G10L 13/027; G10L 13/08; G10L 13/047; G10L 13/00; G06F 9/30003
See application file for complete search history.

(56) References Cited

U.S. PATENT DOCUMENTS

| 5,970,453 A | 10/1999 | Sharman |
| 6,078,885 A | 6/2000 | Beutnagel |

(Continued)

OTHER PUBLICATIONS

Aaron et al. Nov. 28, 2017, Parallel WaveNet: Fast High-Fidelity Speech Synthesis, (Year: 2017).*
(Continued)

*Primary Examiner* — Mohammad K Islam
(74) *Attorney, Agent, or Firm* — North Weber & Baugh LLP

(57) ABSTRACT

Described herein are embodiments of an end-to-end text-to-speech (TTS) system with parallel wave generation. In one or more embodiments, a Gaussian inverse autoregressive flow is distilled from an autoregressive WaveNet by minimizing a novel regularized Kullback-Leibler (KL) divergence between their highly-peaked output distributions. Embodiments of the methodology computes the KL divergence in a closed-form, which simplifies the training process and provides very efficient distillation. Embodiments of a novel text-to-wave neural architecture for speech synthesis are also described, which are fully convolutional and enable fast end-to-end training from scratch. These embodiments significantly outperform the previous pipeline that connects a text-to-spectrogram model to a separately trained WaveNet. Also, a parallel waveform synthesizer embodiment conditioned on the hidden representation in an embodiment of this end-to-end model were successfully distilled.

20 Claims, 14 Drawing Sheets

(a)

(b)

Related U.S. Application Data continuation-in-part of application No. 16/058,265, filed on Aug. 8, 2018, now Pat. No. 10,796,686.

(60) Provisional application No. 62/574,382, filed on Oct. 19, 2017.

(56) References Cited

U.S. PATENT DOCUMENTS

| | | | |
|---|---|---|---|
| 6,366,884 | B1 | 4/2002 | Bellegarda |
| 7,412,393 | B1 | 8/2008 | De Fabbrizio |
| 8,160,877 | B1 | 4/2012 | Nucci |
| 8,898,062 | B2 | 11/2014 | Kato |
| 9,508,341 | B1 | 11/2016 | Parlikar |
| 10,134,388 | B1 | 11/2018 | Lilly |
| 10,319,364 | B2 | 6/2019 | Reber |
| 11,062,615 | B1 | 7/2021 | Speciner |
| 2001/0012999 | A1 | 8/2001 | Vitale |
| 2002/0026315 | A1* | 2/2002 | Miranda ............ G10L 13/04 704/258 |
| 2003/0212555 | A1 | 11/2003 | van Santen |
| 2004/0039570 | A1 | 2/2004 | Harengel |
| 2004/0193398 | A1 | 9/2004 | Chu |
| 2004/0196964 | A1 | 10/2004 | Bluvband |
| 2005/0033575 | A1 | 2/2005 | Schneider |
| 2005/0119890 | A1 | 6/2005 | Hirose |
| 2005/0137870 | A1 | 6/2005 | Mizutani |
| 2005/0182629 | A1 | 8/2005 | Coorman |
| 2005/0192807 | A1 | 9/2005 | Emam |
| 2006/0149543 | A1 | 7/2006 | Lassalle |
| 2006/0200344 | A1 | 9/2006 | Kosek |
| 2006/0271367 | A1 | 11/2006 | Hirabayashi |
| 2007/0005337 | A1 | 1/2007 | Mount |
| 2007/0094030 | A1 | 4/2007 | Xu |
| 2007/0118377 | A1 | 5/2007 | Badino |
| 2007/0150271 | A1 | 6/2007 | Virette |
| 2007/0168189 | A1 | 7/2007 | Tamura |
| 2007/0233494 | A1 | 10/2007 | Shen |
| 2008/0114598 | A1 | 5/2008 | Prieto |
| 2008/0167862 | A1 | 7/2008 | Mohajer |
| 2009/0157383 | A1 | 6/2009 | Cho |
| 2010/0004934 | A1* | 1/2010 | Hirose ............ G10L 21/02 704/261 |
| 2010/0312562 | A1 | 12/2010 | Wang |
| 2011/0087488 | A1 | 4/2011 | Morinaka |
| 2011/0202355 | A1* | 8/2011 | Grill ............ G10L 19/18 704/500 |
| 2012/0035933 | A1 | 2/2012 | Con |
| 2012/0143611 | A1 | 6/2012 | Qian |
| 2012/0203557 | A1 | 8/2012 | Odinak |
| 2012/0265533 | A1 | 10/2012 | Honeycutt |
| 2013/0132085 | A1 | 5/2013 | Mysore |
| 2013/0262096 | A1 | 10/2013 | Wilhelms-Tricarico |
| 2013/0325477 | A1 | 12/2013 | Mitsui |
| 2014/0046662 | A1 | 2/2014 | Tyagi |
| 2014/0236597 | A1 | 8/2014 | Ben Ezra |
| 2015/0199956 | A1 | 7/2015 | Tan |
| 2015/0243275 | A1 | 8/2015 | Luan |
| 2015/0279358 | A1 | 10/2015 | Kingsbury |
| 2016/0078859 | A1 | 3/2016 | Luan |
| 2016/0343366 | A1 | 11/2016 | Fructuoso |
| 2017/0053642 | A1 | 2/2017 | Yamamoto |
| 2017/0148433 | A1 | 5/2017 | Catanzaro |
| 2019/0122651 | A1 | 4/2019 | Arik et al. |

OTHER PUBLICATIONS

Wasserstein GAN and Waveform Loss-based Acoustic Model Training for Multi-speaker Text-to-Speech Synthesis Systems Using a WaveNet Vocoder (Year: 2018).*

Arik et al., "Deep Voice: Real-time neural text-to-speech," arXiv preprint arXiv:arXiv:1702.07825,2017. (17pgs).

Arik et al., "Deep Voice 2: Multi-speaker neural text-to-speech," arXiv preprint arXiv:1705.08947, 2017. (15pgs).

Arik et al.. "Neural voice cloning with a few samples," arXiv preprint arXiv:1802.06006, 2018. (18pgs).

Arik et al., "Fast spectrogram inversion using multi-head convolutional neural networks," arXiv preprint arXiv:1808.06719, 2018. (6pgs).

Bahdanau et al., "Neural machine translation by jointly learning to align and translate," arXiv preprint arXiv:1409.0473, 2016. (15 pgs).

Bengio et al., "Scheduled sampling for sequence prediction with recurrent neural networks," arXiv preprint arXiv:1506.03099, 2015. (9pgs).

Bowman et al., "Generating sentences from a continuous space," In Proceedings of The 20th SIGNLL Conference on Computational Natural Language Learning, 2016. (12pgs).

Chen et al.,"Sample efficient adaptive text-to-speech," arXiv preprint arXiv:1809.10460, 2019. (16pgs).

Chung et al.,"A recurrent latent variable model for sequential data," arXiv preprint arXiv:1506.02216, 2016. (9pgs).

Denton et al., "Stochastic video generation with a learned prior,"arXiv preprint arXiv:1802.07687, 2018. (12pgs).

Kaiser et al., "Fast decoding in sequence models using discrete latent variables," arXiv preprint arXiv:1803.03382, 2018. (10pgs).

Kim et al.,"Sequence-level knowledge distillation," In EMNLP, 2016. (11 pgs).

Kingma et al.,"ADAM: A method for stochastic optimization," In ICLR, 2015. (15 pgs).

Kingma et al.,"Auto-Encoding variational Bayes," In ICLR, 2014. (14 pgs).

Kingma et al.,"Improving variational inference with inverse autoregressive flow," In NIPS, 2016. (9 pgs).

Lee et al., "Deterministic non-autoregressive neural sequence modeling by iterative refinement," arXiv preprint arXiv:1802.06901, 2018. (11 pgs).

Mehri et al.,"SampleRNN:An unconditional end-to-end neural audio generation model," In ICLR, 2017. (11pgs).

Morise et al., "WORLD: a vocoder-based high-quality speech synthesis system for real-time applications," IEICE Transactions on Information & Systems, 2016. (8 pgs).

K. Murphy,"Machine learning, A probabilistic perspective," 2012, [online], [Retrieved Sep. 3, 2019]. Retrieved from Internet <URL: <https://doc.lagout.org/science/Artificial%20lntelligence/Machine%20learning/Machine%20Learning_%20A%20Probabilistic%20Perspective%20%5BMurphy%202012-08-24%5D.pdf> (24 pgs).

Odena et al.,"Deconvolution and checkerboard artifacts," 2016, [Retrieved Sep. 3, 2019]. Retrieved from Internet <URL:<https://distill.pub/2016/deconv-checkerboard/>.(10pgs).

Pascanu et al.,"On the difficulty of training recurrent neural networks," In ICML, 2013. (9pgs).

Ping et al.,"Deep Voice 3: Scaling text-to-speech with convolutional sequence learning," In ICLR, 2018. (16pgs).

Rezende et al.,"Variational inference with normalizing flows," In ICML, 2015. (10 pgs).

Ribeiro et al.,"CrowdMOS: An approach for crowdsourcing mean opinion score studies," In ICASSP, 2011. (4 pgs).

Roy et al.,"Theory and experiments on vector quantized autoencoders," arXiv preprint arXiv:1805.11063, 2018. (11 pgs).

Salimans et al.,"PixelCNN++: Improving the PixelCNN with discretized logistic mixture likelihood and other modifications," In ICLR, 2017. (10pgs).

Shen et al.,"Natural TTS synthesis by conditioning WaveNet on mel spectrogram predictions," In ICASSP, 2018. (5pgs).

Sotelo et al.,"Char2wav:End-to-end speech synthesis," ICLR workshop, 2017. (6pgs).

Taigman et al.,"VoiceLoop: Voice fitting and synthesis via a phonological loop," In ICLR, 2018.(14 pgs).

P. Taylor,"Text-to-Speech Synthesis," Cambridge University Press, 2009. [online], [Retrieved Sep. 3, 2019]. Retrieved from Internet <URL: <http://citeseerx.ist.psu.edu/viewdoc/download?doi=10.1.1.118.5905&rep=rep1&type=pdf>. (19 pgs).

Uria et al.,"RNADE: The real-valued neural autoregressive density-estimator," In Advances in Neural Information Processing Systems, pp. 2175-2183, 2013. (10pgs).

(56) References Cited

OTHER PUBLICATIONS

A.van den Oord et al.,"WaveNet: A generative model for raw audio," arXiv preprint arXiv:1609.03499, 2016. (15pgs).
A.van den Oord et al.,"Conditional image generation with PixelCNN decoders," In NIPS, 2016. (9pgs).
A.van den Oord et al.,"Parallel WaveNet: Fast high-fidelity speech synthesis," In ICML, 2018. (9pgs).
Wang et al.,"Tacotron: Towards end-to-end speech synthesis," In Interspeech, 2017. (5pgs).
R. Yamamoto,"WaveNet vocoder," 2018 [online], [Retrieved Sep. 4, 2019], Retrieved from Internet <URL: <https://github.com/r9y9/wavenet_vocoder>. (6pgs).
Zhao et al.,"Wasserstein GAN & Waveform Loss-based acoustic model training for multi-speaker text-to-speech synthesis systems using a WaveNet vocoder,"IEEE Access,2018.(10pgs).
Gehring,"Convolutional sequence to sequence learing," In ICML, 2017. (10 pgs).
Ping et al.,"ClariNet: ParallelWave Generation in End-to-End Text-to-Speech," arXiv preprint arXiv:1807.07281, 2018. (12 pgs).
Arik et al.,"Deep Voice: Real-time neural text-to-speech," In ICML, 2017. (17pgs).
Arik et al.,"Deep Voice 2: Multi-speaker neural text-to-speech," In NIPS, 2017. (15 pgs).
Bahdanau et al.,"Neural machine translation by jointly learning to align and translate,"In ICLR, 2015. (15 pgs).
Bucilua et al.,"Model Compression," In ACM SIGKDD, 2006. (7 pgs).
Chung et al.,"A recurrent latent variable model for sequential data," In NIPS, 2015. (9pgs).
Dinh et al.,"NICE: Non-linear independent components estimation," arXiv preprint arXiv:1410.8516, 2015. (13 pgs).
Dinh et al.,"Density estimation using Real NVP," In ICLR, 2017. (32pgs).
Griffin et al.,"Signal estimation from modified short-time Fourier transform," IEEE Transactions on Acoustics, Speech, and Signal Processing, 1984. (8pgs).
Gu et al.,"Non-autoregressive neural machine translation," In ICLR, 2018. (13 pgs).
Hinton et al.,"Distilling the knowledge in a neural network," arXiv preprint arXiv:1503.02531, 2015. (9 pgs).
Gehring et al.,"Convolutional sequence to sequence learning," In ICML, 2017. (15pgs).
Hsu et al.,"Hierarchical generative modeling for controllable speech synthesis," In ICLR, 2019. (27pgs).
Jia et al.,"Transfer learning from speaker verification to multispeaker text-to-speech synthesis," arXiv preprint arXiv:1806.04558, 2019. (15pgs).
Kalchbrenner et al.,"Efficient neural audio synthesis," arXiv preprint arXiv:1802.08435, 2018. (10pgs).
Kim et al.,"FloWaveNet: A generative flow for raw audio," arXiv preprint arXiv:1811.02155, 2019. (9pgs).
Kingma et al.,"Glow: Generative flow with invertible 1x1 convolutions," arXiv preprint arXiv:1807.03039, 2018. (15pgs).
Kingma et al.,"Auto-encoding variational Bayes," arXiv preprint arXiv:1312.6114, 2014. (14pgs).
Kingma et al.,"Improving variational inference with inverse autoregressive flow," In NIPS, 2016. (16pgs).
Lee et al.,"Deterministic non-autoregressive neural sequence modeling by iterative refinemen," arXiv preprint arXiv:1802.06901, 2018. (11 pgs).
Nachmani et al.,"Fitting new speakers based on a short untranscribed sample," arXiv preprint arXiv:1802.06984, 2018. (9pgs).
Ping et al.,"ClariNet: Parallel wave generation in end-to-end text-to-speech," arXiv preprint arXiv:1807.07281, 2019. (15pgs).
Prenger et al.,"WaveGlow: A flow-based generative network for speech synthesis,"[online], [Retrieved Mar. 3, 2020]. Retrieved from Internet <URL: https://ieeexplore.ieee.org/abstract/document/8683143>ln ICASSP, 2019. (2pgs).
Rezende et al.,"Variational inference with normalizing flows," arXiv preprint arXiv:1505.05770, 2016. (10pgs).
Rezende et al.,"Stochastic backpropagation and approximate inference in deep generative models," arXiv preprint arXiv:1401.4082, 2014. (14pgs).
P. Taylor"Text-to-Speech Synthesis," Cambridge University Press, 2009. (17pgs).
Van den Cord et al.,"WaveNet: A generative model for raw audio," arXiv preprint arXiv:1609.03499, 2016. (15pgs).
Van den Cord et al.,"Neural discrete representation learning," arXiv preprint arXiv:1711.00937, 2018. (11 pgs).
Van den Cord et al.,"Parallel WaveNet: Fast high-fidelity speech synthesis," arXiv preprint arXiv:1711.10433, 2017. (11 pgs).
Wang et al.,"Neural source-filter-based waveform model for statistical parametric speech synthesis," arXiv preprint arXiv:1904.12088, 2019. (14pgs).
Wang et al.,"Tacotron: Towards end-to-end speech synthesis,"arXiv preprint arXiv:1703.10135, 2017. (10pgs).
Ping et al.,"Deep Voice 3: Scaling text-to-speech with convolutional sequence learning," arXiv preprint arXiv:1710.07654, 2018. (16pgs).
Peng et al.,"Parallel Neural Text-to-Speech," arXiv preprint arXiv:1905.08459, 2019. (14pgs).
Abdel-Hamid et al.,"Fast speaker adaptation of hybrid NN/HMM model for speech recognition based on discriminative learning of speaker code," In ICASSP, 2013. (5pgs).
Arik et al.,"Deep Voice: Real-time neural text-to-speech," arXiv preprint arXiv:1702.07825, 2017. (17 pgs).
Bradbury et al.,"Quasi-Recurrent Neural Networks," In ICLR, 2017. (12pgs).
Cho et al.,"Learning Phrase Representations using RNN Encoder-Decoder for statistical machine translation," arXiv:1406.1078, 2014. (14 pgs).
Fan et al.,"Multi-speaker modeling and speaker adaptation for DNN-based TTS synthesis," In IEEE ICASSP, 2015. (2 pgs).
Graves et al.,"Connectionist temporal classification: labelling unsegmented sequence data with recurrent neural networks," In Proceedings of the 23rd International Conference on Machine Learning (ICML), 2006. (8 pgs).
Hsu et al.,"Voice conversion from unaligned corpora using variational autoencoding wasserstein generative adversarial networks," arXiv:1704.00849, 2017. (5 pgs).
Ioffe et al.,"Batch normalization: Accelerating deep network training by reducing internal covariate shift," arXiv preprint arXiv:1502.03167, 2015. (10 pgs).
Kingma et al.,"ADAM: A method for stochastic optimization," arXiv preprint arXiv:1412.6980, 2014. (9 pgs).
Lample et al.,"Neural architectures for named entity recognition," arXiv preprint arXiv:1603.01360, 2016. (10 pgs).
Li et al.,"Deep speaker: an End-to-End neural speaker embedding system," arXiv preprint arXiv:1705.02304, 2017. (8 pgs).
Mehri et al.,"SampleRNN: An unconditional End-to-End neural audio generation model," arXiv preprint arXiv:1612.07837, 2016. (11 pgs).
Oord et al.,"WaveNet: A generative model for raw audio," arXiv preprint arXiv:1609.03499, 2016. (15 pgs).
Reynolds et al.,"Speaker verification using adapted gaussian mixture models," Digital signal processing, 10(1-3):19-41, 2000. (23 pgs).
Ribeiro et al.,"Crowdmos: An approach for crowdsourcing mean opinion score studies," In IEEE ICASSP, 2011. (4 pgs).
Ronanki et al.,"Median-based generation of synthetic speech durations using a non-parametric approach," arXiv preprint arXiv:1608.06134, 2016. (7 pgs).
Salimans et al.,"Improved techniques for training GANs," In NIPS, 2016. (9 pgs).
Sotelo et al.,"CHAR2WAV: End-to-End speech synthesis," In ICLR2017 workshop submission, 2017. (6pgs).
Wang et al.,"Tacotron: Towards end-to-end speech synthesis," In Interspeech, 2017. (3 pgs).
Wu et al.,"A study of speaker adaptation for DNN-based speech synthesis," In Interspeech, 2015. (5 pgs).
Yamagishi et al.,"Robust speaker-adaptive HMM-based text-to-speech synthesis," IEEE Transactions on Audio, Speech, and Language Processing, 2009. (23 pgs).

(56) References Cited

OTHER PUBLICATIONS

Yang et al.,"On the training of DNN-based average voice model for speech synthesis," In Signal & Info. Processing Association Annual Summit & Conference (APSIPA), Retrieved from Internet <URL: <http://www.nwpu-aslp.org/lxie/papers/2016APSIPA-YS.pdf>, 2016. (6 pgs).

Zen et al.," Unidirectional long short-term memory recurrent neural network with recurrent output layer for low-latency speech synthesis," In IEEE ICASSP, 2015. (5 pgs).

Zen et al.,"Fast, Compact, and High quality LSTM-RNN based statistical parametric speech synthesizers for mobile devices," arXiv:1606.06061, 2016. (14 pgs).

Abadi et al.,"TensorFlow: Large-scale machine learning on heterogeneous systems," Retrieved from Internet <URL: http://download.tensorflow.org/paper/whitepaper2015.pdf>, 2015. (19pgs).

Amodei et al.,"Deep speech 2: End-to-End speech recognition in English and Mandarin," arXiv preprint arXiv:1512.02595, 2015. (28pgs).

Boersma et al.,"PRAAT, a system for doing phonetics by computer," Glot international, vol. 5, No. 9/10, Nov./Dec. 2001 (341-347). (7pgs).

Bradbury et al.,"Quasi-recurrent neural networks," arXiv preprint arXiv: 1611.01576, 2016. (11 pgs).

Chung et al.,"Empirical evaluation of gated recurrent neural networks on sequence modeling," arXiv preprint arXiv:1412.3555, 2014. (9 pgs).

Diamos et al.,"Persistent RNNS: Stashing recurrent weights On-Chip," In Proceedings of The 33rd International Conference on Machine Learning, 2016. (10pgs).

Dukhan et al.,"PeachPy meets Opcodes: direct machine code generation from Python," In Proceedings of the 5th Workshop on Python for High-Performance and Scientific Computing, 2015. (2 pgs).

Graves et al.,"Connectionist temporal classification:Labelling unsegmented sequence data with recurrent neural networks,"In Proc of the 23rd Int'l Con on Machine Learning, 2006. (8 pgs).

Morise et al.,"WORLD: a vocoder-based high-quality speech synthesis system for real-time applications,"IEICE TRANSACTIONS on Information and Systems, 2016. (8 pgs).

Oord et al.,"Pixel recurrent neural networks," arXiv preprint arXiv:1601.06759, 2016. (10 pgs).

Paine et al.,"Fast wavenet generation algorithm," arXiv preprint arXiv:1611.09482, 2016. (6 pgs).

Pascual et al.,"Multi-output RNN-LSTM for multiple speaker speech synthesis with interpolation model," 9th ISCA Speech Synthesis Workshop, 2016. (6 pgs).

Prahallad et al.,"The blizzard challenge 2013-lndian language task," Retrieved from Internet <URL: <http://festvox.org/blizzard/bc2013/blizzard_2013_summary_indian.pdf>, 2013. (11 pgs).

Rao et al.,"Grapheme-to-phoneme conversion using long short-term memory recurrent neural networks," In Acoustics, Speech and Signal Processing (ICASSP), 2015 IEEE International Conference, 2015.(5 pgs).

Ribeiro et al.,"Crowdmos: An approach for crowdsourcing mean opinion score studies," In Acoustics, Speech & Signal Processing (ICASSP) IEEE Intr Conference, 2011. (4 pgs).

Ronanki et al.,"A template-based approach for speech synthesis intonation generation using LSTMs," Interspeech 2016, pp. 2463-2467, 2016. (5pgs).

Sotelo et al.,"Char2wav: End-to-End speech synthesis," Retrieved from Internet <URL:<https://openreview.net/pdf?id=B1VWyySKx>, 2017. (6pgs).

Stephenson et al.,"Production Rendering, Design and Implementation," Springer, 2005. (5pgs).

Taylor et al.,"Text-to-Speech Synthesis," Cambridge University Press, New York, NY, USA, 1st edition, 2009. ISBN 0521899273, 9780521899277. (17 pgs).

Theis et al.,"A note on the evaluation of generative models," arXiv preprint arXiv:1511.01844, 2015. (9 pgs).

Weide et al.,"The CMU pronunciation dictionary," Retrieved from Internet <URL: <http://www.speech.cs.cmu.edu/cgi-bin/cmudict>, 2008. (2pgs).

Yao et al.,"Sequence-to-sequence neural net models for grapheme-to-phoneme conversion," arXiv preprint arXiv:1506.00196, 2015. (5 pgs).

Zen et al.,"Unidirectional long short-term memory recurrent neural network with recurrent output layer for low-latency speech synthesis," Retrieved from Internet <URL: <https://static.googleusercontent.com/media/research.google.com/en//pubs/archive/43266.pdf>, 2015. (5pgs).

Zen et al.,"Statistical parametric speech synthesis using deep neural networks," Retrieved from Internet <URL: <https://static.googleusercontent.com/media/research.google.com/en//pubs/archive/40837.pdf>, 2013. (5pgs).

Y. Agiomyrgiannakis,"Vocaine the vocoder and applications in speech synthesis," In ICASSP, 2015. (5 pgs).

Arik et al.,"Deep Voice: Real-time neural text-to-speech," arXiv preprint arXiv:1702.07825v2, 2017. (17 pgs).

Arik et al.,"Deep Voice 2: Multi-speaker neural text-to-speech," arXiv preprint arXiv:1705.08947v1, 2017. (15 pgs).

C. Bagwell," SoX—Sound exchange," [online], [Retrieved Jul. 22, 2019], Retrieved from Internet <URL:https://sourceforge.net/p/sox/code/ci/master/tree/> (3 pgs).

Bahdanau et al.,"Neural machine translation by jointly learning to align and translate," arXiv preprint arXiv:1409.0473v1, 2014. (15pgs).

Capes et al.,"Siri On-Device Deep Learning-Guided Unit Selection Text-to-Speech System," In Interspeech, 2017. (5pgs).

Cho et al.,"Learning phrase representations using RNN encoder-decoder for statistical machine translation," In EMNLP, 2014. (11 pgs).

Chorowski et al., "Attention-based models for speech recognition," In NIPS, 2015. (9pgs).

Dauphin et al.,"Language modeling with gated convolutional networks," arXiv preprint arXiv:1612.08083v1, 2016. (8pgs).

Gehring et al.,"Convolutional sequence to sequence learning," arXiv preprint arXiv:1705.03122v1, 2017. (15 pgs).

Gonzalvo et al.,"Recent advances in Google real-time HMM-driven unit selection synthesizer," In Interspeech, 2016. (5 pgs).

Kawahara et al.,"Restructuring speech representations using a pitch-adaptive time-Frequency smoothing and an instantaneous-frequency-based F0 extraction: Possible role of a Repetitive structure in sounds," Speech communication, 1999. (21 pgs).

Ochshorn et al., "Gentle," Retrieved from Internet <URL: https://github.com/lowerquality/gentle> 2017. (2 pgs).

Van den Oord et al.,"WaveNet: A generative model for raw audio," arXiv:1609.03499, 2016. (15 pgs).

Panayotov et al.,"Librispeech: an ASR corpus based on public domain audio books," In Acoustics, Speech and Signal Processing (ICASSP), 2015 IEEE. (5 pgs).

Raffel et al.,"Online and linear-time attention by enforcing monotonic alignments," arXiv:1704.00784v1, 2017. (19 pgs).

Rush et al.,"A neural attention model for abstractive sentence summarization," In EMNLP, 2015. (11 pgs).

Salimans et al.,"Weight normalization: A simple reparameterization to accelerate training of deep neural networks," In NIPS, arXiv:1602.07868v3, 2016. (11 pgs).

Sotelo et al.,"Char2wav: End-to-end speech synthesis," In ICLR workshop, 2017. (6 pgs).

Sutskever et al., "Sequence to Sequence Learning with Neural Networks", In NIPS, 2014. (9 pgs).

Taigman et al., "Voiceloop: Voicefitting Andsynthesis Via Aphonologicalloop", arXiv preprint arXiv:1707.06588, 2017. (12pgs).

Paul Taylor,"Text-to-Speech Synthesis,"[online], [Retrieved Aug. 1, 2019]. Retrieved from Internet <URL: <http://citeseerx.ist.psu.edu/viewdoc/download? doi=10.1.1.118.5905&rep=rep1&type=pdf> Cambridge University Press, 2009 (22 pgs).

Vaswani et al., "Attention Is All You Need", arXiv preprint arXiv:1706.03762, 2017.(15 pgs).

Yamagishi et al., "Robust Speaker-Adaptive HMM-Based Text-to-Speech Synthesis," In IEEE Transactions on Audio, and Language Processing, 2009. (23pgs).

(56) References Cited

OTHER PUBLICATIONS

Yamagishi et al., "Thousands of Voices for HMM-Based Speech Synthesis-Analysis and Application of 1 1S Systems Built on Various ASR Corpora", In IEEE Transactions on Audio,.Speech, and Language Processing, 2010. (21 pgs).

Yamagishi et al.."Robust Speaker-Adaptive HMM-Based Text-to-Speech Synthesis," IEEE Transactions On Audio, Speech, and Language Processing, vol. 17, No. 6, Aug. 2009,.[online], [Retrieved 2018-07-08]. Retrieved from Internet <URL: <https://www.researchgate.net/publication/224558048> (24 pgs).

U.S. Appl. No. 15/882,926, U.S. Pat. No. 10/872,598, Sercan Arik, Systems and Methods for Real-Time Neural Text-To-Speech, filed Jan. 29, 2018, Dec. 22, 2020.

U.S. Appl. No. 15/974,397, U.S. Pat. No. 10/896,669, Sercan Arik, Systems and Methods for Multi-Speaker Neural Text-To-Speech, filed May 8, 2018, Jan. 19, 2021.

U.S. Appl. No. 16/058,265, U.S. Pat. No. 10/796,686, Sercan Arik, Systems and Methods for Neural Text-To-Speech Using Convolutional Sequence Learning, filed Aug. 8, 2018, Oct. 6, 2020.

U.S. Appl. No. 16/277,919, U.S. Pat. No. 10/872,596, Wei Ping, Systems and Methods for Parallel Wave Generation in End-To-End Text-To-Speech, Filed Feb. 15, 2019, Dec. 22, 2020.

Non-Final Office Action, dated Jan. 5, 2022, in related U.S. Appl. No. 17/061,433. (10 pgs).

Notice of Allowance and Fee(s) Due, dated Jan. 22, 2021, in related U.S. Appl. No. 16/654,955. (10 pgs).

U.S. Appl. No. 15/882,926, U.S. Pat. No. 10/872,598, Sercan Arik, Systems and Methods for Real-Time Neural Text-To-Speech, filed Jan. 29, 2018, dated Dec. 22, 2020.

Pending, U.S. Appl. No. 17/061,433, Sercan Arik, Real-Time Text-To Speech.

U.S. Appl. No. 15/974,397, Sercan Arik, Systems and Methods for Multi-Speaker Neural Text-To-Speech, filed May 8, 2018, dated Jan. 19, 2021.

Pending, U.S. Appl. No. 17/087,524, Sercan Arik, Multi-Speaker Neural Text-To-Speech.

U.S. Appl. No. 16/058,265, U.S. Pat. No. 10/796,686, Sercan Arik, Systems and Methods for Neural Text-To-Speech Using Convolutional Sequence Learning, filed Aug. 8, 2018, dated Oct. 6, 2020.

U.S. Appl. No. 16/277,919, U.S. Pat. No. 10/872,596, Wei Ping, Systems and Methods for Parallel Wave Generation in End-To-End Text-To-Speech, filed Feb. 15, 2019, dated Dec. 22, 2020.

U.S. Appl. No. 16/654,955, Kainan Peng. Parallel Neural Text-To-Speech, filed Oct. 16, 2019.

Final Office Action, dated May 13, 2022, in related U.S. Appl. No. 17/061,433. (10 pgs).

Response to Non-Final Office Action, filed Apr. 5, 2022, n related U.S. Appl. No. 17/061,433. (12 pgs).

Non-Final Office Action dated Jul. 11, 2022, in U.S. Appl. No. 17/087,524 (14 pgs).

Non-Final Office Action dated Aug. 30, 2022, in U.S. Appl. No. 17/061,433 (10 pgs).

\* cited by examiner (a)

(b)

WAVEFORM GENERATION USING END-TO-END TEXT-TO-WAVEFORM SYSTEM

CROSS REFERENCE TO RELATED PATENT APPLICATIONS

This application is a continuation of and claims the priority benefit of commonly-owned U.S. Pat. No. 10,872, 596 (U.S. patent application Ser. No. 16/277,919, filed on 15 Feb. 2019 and issued on 22 Dec. 2020, entitled "SYSTEMS AND METHODS FOR PARALLEL WAVE GENERATION IN END-TO-END TEXT-TO-SPEECH," listing, Wei Ping, Kainan Peng, and Jitong Chen as inventors, which is a continuation-in-part application of and claims priority to U.S. Pat. No. 10,796,686 (U.S. patent application Ser. No. 16/058,265, filed on 8 Aug. 2018 and issued on 6 Oct. 2020, entitled "SYSTEMS AND METHODS FOR NEURAL TEXT-TO-SPEECH USING CONVOLUTIONAL SEQUENCE LEARNING," and listing Sercan Pink, Wei Ping, Kainan Peng, Sharan Narang, Ajay Kannan, Andrew Gibiansky, Jonathan Raiman, and John Miller as inventors, which claimed priority under 35 U.S.C. § 119(e) to U.S. Prov. Pat. Appl. No. 62/574,382, filed on 19 Oct. 2017, entitled "SYSTEMS AND METHODS FOR NEURAL TEXT-TO-SPEECH USING CONVOLUTIONAL SEQUENCE LEARNING," and listing Sercan Pink, Wei Ping, Kainan Peng, Sharan Narang, Ajay Kannan, Andrew Gibiansky, Jonathan Raiman, and John Miller as inventors. Each of the aforementioned patent documents is incorporated by reference herein in its entirety and for all purposes.

BACKGROUND

A. Technical Field

The present disclosure relates generally to systems and methods for text-to-speech. More particularly, the present disclosure relates to systems and methods for end-to-end text-to-speech.

B. Background

Artificial speech synthesis systems, commonly known as text-to-speech (TTS) systems, convert written language into human speech. TTS systems are used in a variety of applications, such as human-technology interfaces, accessibility for the visually-impaired, media, and entertainment. Traditional TTS systems are based on complex multi-stage hand-engineered pipelines. Typically, these systems first transform text into a compact audio representation, and then convert this representation into audio using an audio waveform synthesis method called a vocoder Autoregressive generative models have been explored for waveform synthesis. They operate at a very high temporal resolution of raw audios. Their convolutional structure enables parallel processing at training by teacher-forcing the complete sequence of audio samples. However, the autoregressive nature makes it prohibitively slow at inference, because each sample must be drawn from the output distribution before it can be passed in as input at the next time-step. In order to generate high-fidelity speech in real time, one has to develop highly engineered inference kernels.

Accordingly, what is needed are systems and methods for speech synthesis to enable fast inference and end-to-end training for improved performance.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures may not be to scale.

DETAILED DESCRIPTION OF EMBODIMENTS

Figure 1:
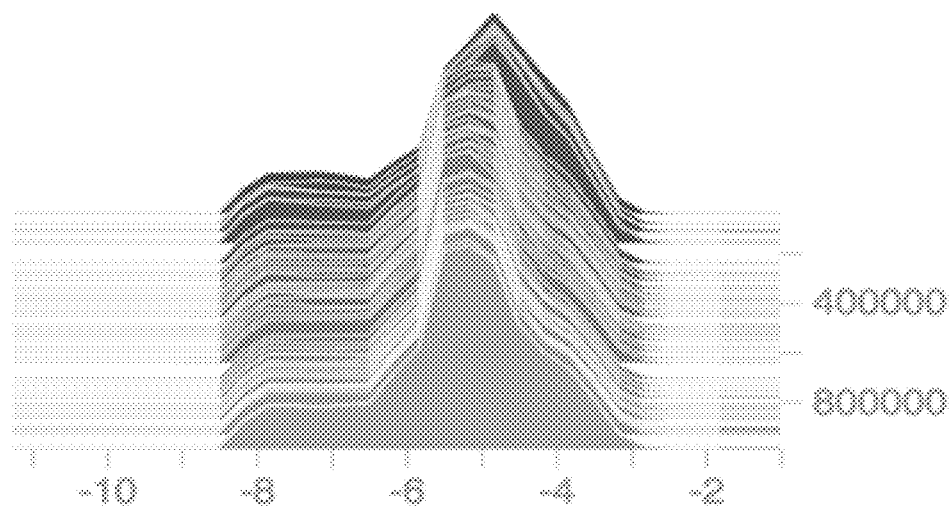
FIG. 1 depicts empirical histograms of standard deviations in teacher WaveNet and in student inverse autoregressive flow (IAF) during density distillation according to embodiments of the present disclosure.
Figure 1:
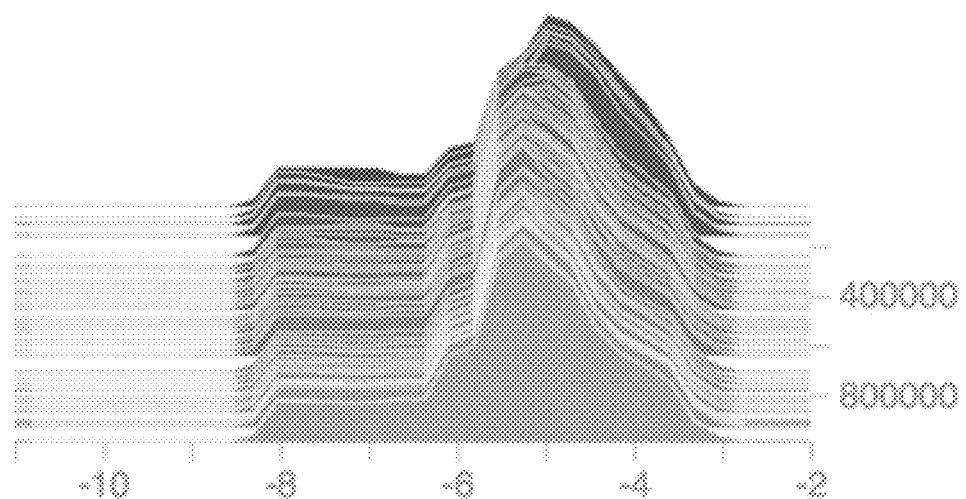

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

Speech synthesis, also called text-to-speech (TTS), is traditionally done with complex multi-stage hand-engineered pipelines. Recent successes of deep learning methods for TTS lead to high-fidelity speech synthesis, much simpler "end-to-end" pipelines, and a single TTS model that reproduces thousands of different voices.

WaveNet (Oord et al., *WaveNet: A generative Model for Raw Audio*, arXiv:1609.03499, 2016) is an autoregressive generative model for waveform synthesis. It operates at a very high temporal resolution of raw audios (e.g., 24,000 samples per second). Its convolutional structure enables parallel processing at training by teacher-forcing the complete sequence of audio samples. However, the autoregressive nature of WaveNet makes it prohibitively slow at inference, because each sample must be drawn from the output distribution before it can be passed in as input at the next time-step. In order to generate high-fidelity speech in real time, one has to develop highly engineered inference kernels.

Most recently, Oord et al. (*Parallel WaveNet: Fast high-fidelity speech synthesis*, ICML, 2018) proposed a teacher-student framework to distill a parallel feed-forward network from an autoregressive teacher WaveNet. The non-autoregressive student model can generate high-fidelity speech at 20 times faster than real-time. To backpropagate through random samples during distillation, parallel WaveNet employs the mixture of logistics (MoL) distribution as the output distribution for teacher WaveNet, and a logistic distribution based inverse autoregressive flow (IAF) (Kingma et al., *Improving variational inference with inverse autoregressive flow*, In NIPS, 2016) as the student model. It minimizes a set of losses including the Kullback-Leibler (KL) divergence between the output distributions of the student and teacher networks. However, one has to apply Monte Carlo method to approximate the intractable KL divergence between the logistic and MoL distributions, which may introduce large variances in gradients, especially for highly peaked distributions, and lead to an unstable training process in practice.

Presented herein are various embodiments with a novel parallel wave generation method based on the Gaussian inverse autoregressive flow for speech synthesis. Some of the contributions provided by embodiments disclosed herein include but are not limited to:

1. It is demonstrated that a single variance-bounded Gaussian is sufficient for modeling the raw waveform in WaveNet without degradation of audio quality. The presented Gaussian autoregressive WaveNet is simply trained with maximum likelihood estimation (MLE).

2. A Gaussian IAF is distilled from the autoregressive WaveNet by minimizing a novel regularized KL divergence between their peaked output distributions. The method presented in this patent disclosure provides closed-form estimation of KL divergence, which largely simplifies the distillation algorithm and stabilizes the training process.

3. In previous studies, "end-to-end" speech synthesis actually refers to the text-to-spectrogram models with a separate waveform synthesizer (i.e., vocoder). In this patent disclosure, a first text-to-wave neural architecture is proposed for TTS, which is fully convolutional and enables fast end-to-end training from scratch. The presented text-to-wave model significantly outperforms the separately trained pipeline in naturalness.

4. A parallel neural vocoder is also successfully distilled conditioned on the learned hidden representation within the end-to-end architecture. The text-to-wave model with the parallel vocoder obtains competitive results as the model with an autoregressive vocoder.

The rest of this patent disclosure is organized as follows: Section B discusses related work; embodiments of the parallel wave generation method are discussed in Section C; and embodiments of the text-to-wave architecture are presented in Section D. Some experimental results are reported in Section E and some conclusions are given in Section F.

B. Related Work

Neural speech synthesis has obtained the state-of-the-art results and gained a lot of attention recently.

Several neural TTS systems were proposed, including: Deep Voice 1 (which is disclosed in commonly-assigned U.S. patent application Ser. No. 15/882,926, filed on 29 Jan.

2018, entitled "SYSTEMS AND METHODS FOR REAL-TIME NEURAL TEXT-TO-SPEECH," and U.S. Prov. Pat. App. No. 62/463,482, filed on 24 Feb. 2017, entitled "SYSTEMS AND METHODS FOR REAL-TIME NEURAL TEXT-TO-SPEECH," each of the aforementioned patent documents is incorporated by reference herein in its entirety (which disclosures may be referred to, for convenience, as "Deep Voice 1" or "DV1"); Deep Voice 2 (which is disclosed in commonly-assigned U.S. patent application Ser. No. 15/974,397, filed on 8 May 2018, entitled "SYSTEMS AND METHODS FOR MULTI-SPEAKER NEURAL TEXT-TO-SPEECH", and U.S. Prov. Pat. App. No. 62/508,579, filed on 19 May 2017, entitled "SYSTEMS AND METHODS FOR MULTI-SPEAKER NEURAL TEXT-TO-SPEECH", each of the aforementioned patent documents is incorporated by reference herein in its entirety (which disclosures may be referred to, for convenience, as "Deep Voice 2" or "DV2"); Deep Voice 3 (which is disclosed in commonly-assigned U.S. patent application Ser. No. 16/058,265, filed on 8 Aug. 2018, entitled "SYSTEMS AND METHODS FOR NEURAL TEXT-TO-SPEECH USING CONVOLUTIONAL SEQUENCE LEARNING", and U.S. Prov. Pat. App. No. 62/574,382, filed on 19 Oct. 2017, entitled "SYSTEMS AND METHODS FOR NEURAL TEXT-TO-SPEECH USING CONVOLUTIONAL SEQUENCE LEARNING", each of the aforementioned patent documents is incorporated by reference herein in its entirety (which disclosures may be referred to, for convenience, as "Deep Voice 3" or "DV3"); Tacotron; Char2Wav; and VoiceLoop.

Certain Deep Voice 1 & 2 embodiments retain the traditional TTS pipeline, which has separate grapheme-to-phoneme, phoneme duration, frequency, and waveform synthesis models. In contrast, Tacotron, certain Deep Voice 3 embodiments, and Char2Wav employ the attention based sequence-to-sequence models, yielding more compact architectures. In the literature, these models are usually referred to as "end-to-end" speech synthesis. However, they depend on a traditional vocoder, the Griffin-Lim algorithm, or a separately trained neural vocoder to convert the predicted spectrogram to raw audio. In the present disclosure, a novel text-to-wave neural architecture for TTS based on Deep Voice 3 embodiments is disclosed.

The neural network based vocoders, such as WaveNet and SampleRNN, play a very important role in recent advances of speech synthesis. In a TTS system, WaveNet can be conditioned on linguistic features, fundamental frequency ($F_0$), phoneme durations, or the predicted mel-spectrograms from a text-to-spectrogram model. In the present disclosure, embodiments of a novel methodology of parallel waveform synthesis by conditioning it on mel-spectrograms are disclosed.

Normalizing flows are a family of stochastic generative models, in which a simple initial distribution is transformed into a more complex one by applying a series of invertible transformations. Normalizing flow provides efficient sampling and arbitrarily complex posterior distribution, making it well suited for the inference network in variational autoencoder. Inverse autoregressive flow (IAF) is a special type of normalizing flow where each invertible transformation is based on an autoregressive neural network. Learning an IAF with maximum likelihood can be very slow. In the present disclosure, a Gaussian IAF is distilled from a pre-trained autoregressive generative model by minimizing a numerically stable variant of KL divergence.

Knowledge distillation is originally proposed for compressing large models to smaller ones. In deep learning, a smaller student network is distilled from the teacher network by minimizing the loss between their outputs (e.g., L2 or cross-entropy). In parallel WaveNet, a non-autoregressive student-net is distilled from an autoregressive WaveNet by minimizing the reverse KL divergence. Similar techniques are applied in non-autoregressive models for machine translation.

C. Parallel Wave Generation Embodiments

In this section, embodiments of using the Gaussian autoregressive WaveNet as the teacher-net and the Gaussian inverse autoregressive flow as the student-net are presented. Embodiments of density distillation methodology are also disclosed.

1. Gaussian Autoregressive Wavenet

In one or more embodiments, WaveNet models the joint distribution of high dimensional waveform $x=\{x_1, \ldots, x_T\}$ as the product of conditional distributions using the chain rules of probability, $$p(x|c) = \Pi_{t=1}^T p(x_t|x_{<t}, c; \theta), \quad (1)$$

where $x_t$ is the t-th variable of x, $x_{<t}$ represent all variables before t-step, c is the global conditioner (e.g., mel-spectrogram, or learned hidden representation in Section D), which may be omitted for concise notations, and $\theta$ are parameters of the model. The autoregressive WaveNet takes $x_{<t}$ as input, and outputs the probability distribution over $x_t$.

The original WaveNet treats $x_t$ as a 256-way categorical variable. In practice, high fidelity audio (16-bit per sample) may require as many as 65,536 softmax units to model, which could be prohibitively expensive. Parallel WaveNet advocates mixture of logistics (MoL) distribution introduced in PixelCNN++(Salimans, et al., PixelCNN++: Improving the PixelCNN with Discretized Logistic Mixture Likelihood and Other Modifications, ICLR, 2017) for autoregressive teacher-net, as it requires much fewer output units. More importantly, the output distribution of student-net is required to be differentiable over random samples x and allow backpropagation from teacher-net to student-net during distillation. As a result, one needs to choose a continuous output distribution for teacher-net in order to match the student-net. Directly maximizing the log-likelihood of MoL is prone to numerical issues, and one has to employ the quantized surrogate loss in PixelCNN++.

In the present patent disclosure, it is demonstrated that a single Gaussian output distribution for WaveNet suffices to model the raw waveform. The using of the single Gaussian instead of mixture of Gaussians as the output distribution might raise the modeling capacity concern. However, their comparable performance is demonstrated in experiments in the present disclosure. Also, it should be noted, parallel WaveNet eventually uses a single logistic distribution as the output of student network and still obtains very good results.

In one or more embodiments, the conditional distribution of $x_t$ given previous samples $x_{<t}$ is:

$$p(x_t|x_{<t}; \theta) = \mathcal{N}(\mu(x_{<t}; \theta), \sigma(x_{<t}; \theta)), \quad (2)$$

where $\mu(x_{<t}; \theta)$ and $\sigma(x_{<t}; \theta)$ are mean and standard deviation predicted by the autoregressive WaveNet (which always predicts log $\sigma(x_{<t})$ and operates at log-scale), respectively. Given observed data, maximum likelihood estimation (MLE) is performed for parameters $\theta$. Note that if the model gives very accurate prediction of $\mu(x_{<t})$ (i.e., $\mu(x_{<t}) \approx x_t$) and it is free to minimize $(x_{<t})$, then the log-likelihood can approach to infinity. To avoid this degenerate case, the lower bound the predicted log $\sigma(x_{<t})$ is set at −7 (natural logarithm) before calculating the log-likelihood.

Figure 9:
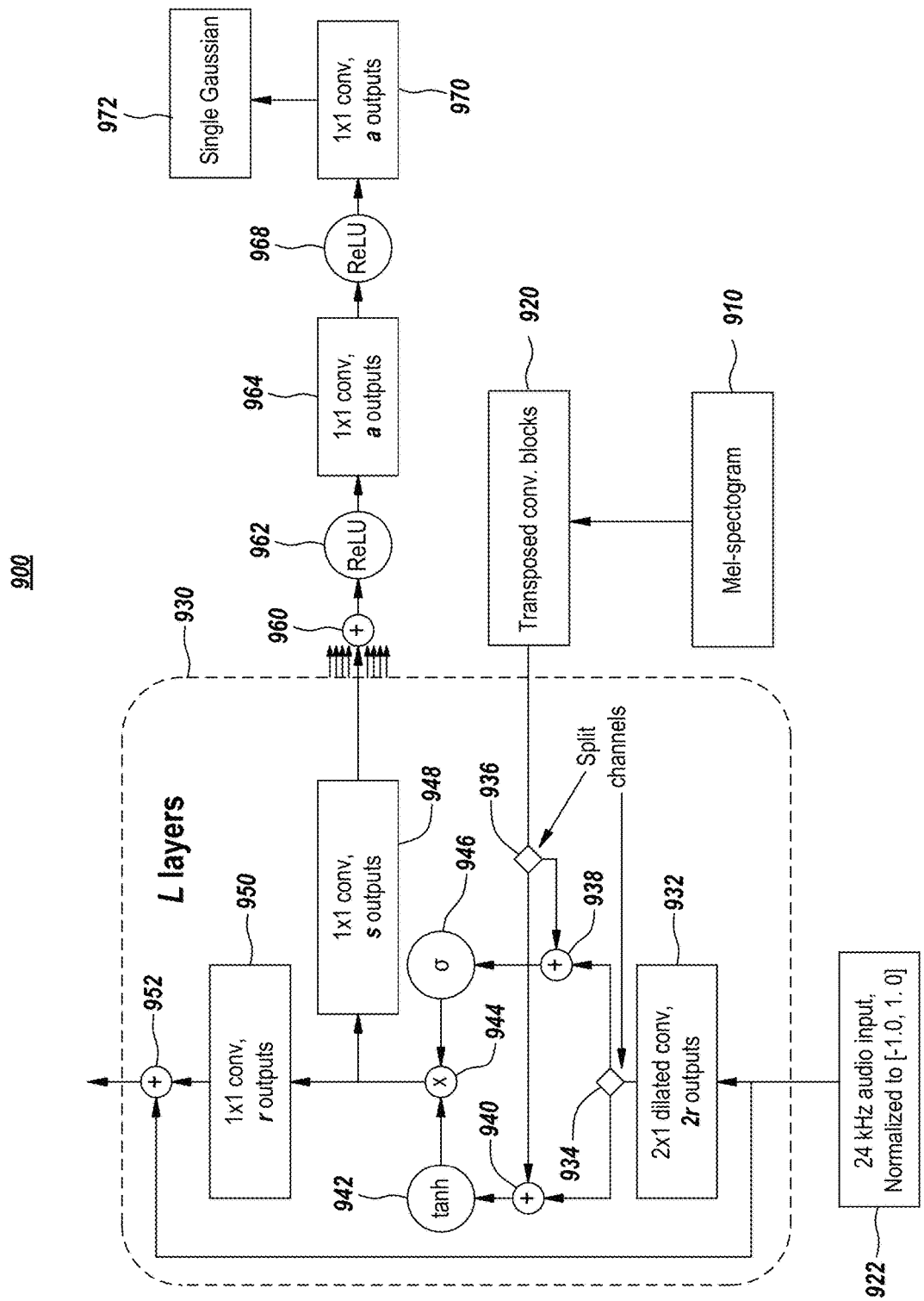
FIG. 9 depicts a block diagram for the vocoder in the text-to-wave architecture according to embodiments of the present disclosure.

In one or more embodiments, architecture similar to WaveNet is used, such as block 930 in FIG. 9. Furthermore, a stack of dilated convolution blocks are employed, where each block has multiple (e.g. 10) layers and the dilation is doubled at each layer, i.e., $\{1, 2, 4, \ldots, 512\}$ (see "Details of Dilated Convolution Block" below). The output hidden states from each layer are added through residual connection before projecting them to the number of skip channels.

Details of Dilated Convolution Block:

In dilated convolution block, the i-th hidden layer $h^{(i)}$ with dilation $2^{i-1}$ by gated convolutions is computed as:

$$h^{(i)} = \text{sigmoid}(W_g^{(i)} * h^{(i-1)} + A_g^{(i)} \cdot c + b_g^{(i)}) \odot \tan h(W_f^{(i)} * h^{(i-1)} + A_f^{(i)} \cdot c + b_f^{(i)})$$

Wherein $h^0 = x$ is the input of the block, $*$ denotes the causal dilated convolution, $\cdot$ represents 1×1 convolution over the upsampled conditioner c, $\odot$ denotes the element-wise multiplication, $W_g^{(i)}$, $A_g^{(i)}$, $b_g^{(i)}$ are convolutions and bias parameters at i-th layer for sigmoid gating function, and $W_f^{(i)}$, $A_f^{(i)}$, $b_f^{(i)}$ are analogous parameters for tan h function.

In one or more embodiments, 80-band log-mel spectrogram is used as the global conditioner. To upsample the conditioner from frame-level (80 per second) to sample-level (24,000 per second), two layers of transposed 2-D convolution (in time and frequency) interleaved with leaky ReLU ($\alpha = 0.4$) are applied. The upsampling strides in time are 15 and 20 for the two layers, respectively. Correspondingly, the 2-D convolution filter sizes are set as (30, 3) and (40, 3), where the filter sizes (in time) are doubled from strides to avoid the checkerboard artifacts. It is also found that normalizing log-mel spectrogram to the range of [0, 1] improves the audio quality.

2. Gaussian Inverse Autoregressive Flow (IAF)

Normalizing flows map a simple initial density q(z) (e.g., isotropic Gaussian distribution) into a complex one by applying an invertible transformation $x = f(z)$. Given $f$ is a bijection, the distribution of x may be obtained through the change of variables formula:

$$q(x) = q(z) \left| \det\left(\frac{\partial f(z)}{\partial z}\right) \right|^{-1} \tag{3}$$

where det $$\left(\frac{\partial f(z)}{\partial z}\right)$$

is the determinant of the Jacobian and is computationally expensive to obtain in general. Inverse autoregressive flow (IAF) is a particular normalizing flow with a simple Jacobian determinant. Suppose z has the same dimension as x, the transformation in IAF is based on an autoregressive neural network taking z as the input: $x_t = f(z_{\leq t}; \vartheta)$, where $\vartheta$ are parameters of the model. Note that the t-th variable $x_t$ only depends on previous and current latent variables $z_{\leq t}$, thus the Jacobian is a triangular matrix and the determinant is the product of the diagonal entries, $$\det\left(\frac{\partial f(z)}{\partial z}\right) = \prod_t \frac{\partial f(z_{\leq t})}{\partial z_t}, \tag{4}$$

which is easy to calculate. Parallel WaveNet uses a logistic distribution based IAF to match its mixture of logistics (MoL) teacher.

In one or more embodiments, the Gaussian IAF is used and the transformation $x_t = f(z_{\leq t}; \vartheta)$ is defined as:

$$x_t = z_t \cdot \sigma(z_{<t}; \vartheta) + \mu(z_{<t}; \vartheta), \tag{5}$$

where the shifting function $\mu(z_{<t}; \vartheta)$ and scaling function $\sigma(z_{<t}; \vartheta)$ are modeled by an autoregressive WaveNet in Section C.1. Importantly, if assuming $z_t \sim \mathcal{N}(z_t | \mu_0, \sigma_0)$, it is easy to observe that $x_t$ also follows a Gaussian distribution, where $\mu_q = \mu_0 \cdot \sigma(z_{<t}; \vartheta) + \mu(z_{<t}; \vartheta)$ and $\sigma_q = \sigma_0 \cdot \sigma(z_{<t}; \vartheta)$. Note that x is conditionally independent given a sample of latent variables z, and its distribution is fully decomposed over dimension t, $$q(x|z; \vartheta) = \Pi_t q(x_t | z_{<t}; \vartheta) \tag{7}$$

which enables parallel sampling and makes efficient use of computational resource like GPU. In contrast, the marginal distribution of x, $$q(x; \vartheta) = \int q(x|z; \vartheta) q(z) dz, \tag{8}$$

lacks closed-form expression and $x = \{x_1, \ldots, x_T\}$ are highly correlated through the marginalized latents $z = \{z_1, \ldots, z_T\}$. Thus, the IAF indeed jointly infers its output x at all time steps.

To evaluate the likelihood of observed data x, the identities Eq. (3) and (4) may still be used, and by plugging in the transformation defined in Eq. (5), it yields:

$$q(x; \vartheta) = q(z)(\Pi_t \sigma(z_{<t}; \vartheta))^{-1}, \tag{9}$$

However, the inverse transformation of Eq. (5) is desired:

$$z_t = \frac{x_t - \mu(z_{<t}; \vartheta)}{\sigma(z_{<t}; \vartheta)}, \tag{10}$$

to compute the corresponding z from x, which is autoregressive and very slow. As a result, learning an IAF directly through maximum likelihood is impractical.

In general, normalizing flows require a series of transformations until the distribution $q(x|z; \vartheta)$ reaches a desired level of complexity. To meet this requirement, in one or more embodiments of IAF, a white noise sample $z^{(0)}$ is first drawn from the isotropic Gaussian distribution $\mathcal{N}(0,1)$. Then the transformation $z_t^{(i)} = f(z_{\leq t}^{(i-1)}; \vartheta)$ defined in Eq. (5) from $z^{(0)} \to \ldots z^{(i)} \to \ldots z^{(n)}$ is repeatedly applied, wherein $x = z^{(n)}$. An embodiment of this procedure is summarized in Methodology 1, which is a closed-form solution, below. In one or more embodiments, the parameters are not shared across difference flows.

---

Methodology 1 Gaussian Inverse Autoregressive Flows as Student Network

Input: $z^{(0)} \sim \mathcal{N}(0,1)$: white noises;
  n: number of flows;
  $\vartheta^{(i)}$: parameters of autoregressive WaveNet for the i-th flow;

-continued

---
Methodology 1 Gaussian Inverse Autoregressive Flows as Student Network
---

Output:
    samples x;
    output distribution $q(x|z^{(0)})$ with mean $\mu_q$ and standard deviation $\sigma_q$
Initialize $\mu_z = 0$, $\sigma_z = 1$
for i-th flow in [1:n] do
    Run autoregressive WaveNet $\vartheta^{(i)}$ by taking $z^{(i-1)}$ as input
        $\mu[t] \leftarrow \mu(z_{<t}^{(i-1)}; \vartheta^{(i)})$
        $\sigma[t] \leftarrow \sigma(z_{<t}^{(i-1)}; \vartheta^{(i)})$
        $z^{(i)} = z^{(i-1)} \odot \sigma + \mu$
        $\sigma_z = \sigma_z \odot \sigma$
        $\mu_z = \mu_z \odot \sigma + \mu$
end for
$x = z^{(n)}$, $\mu_q = \mu_z$, $\sigma_q = \sigma_z$
Remark: iterating over log $\sigma$ in log-scale improves numerical stability in practice.

---

3. Knowledge Distillation Embodiments

Oord et al. 2018 (referenced above) proposed the probability density distillation method to circumvent the difficulty of maximum likelihood learning for IAF. In distillation, the student IAF tries to match the distribution of its own sample to the distribution of such a sample under the pre-trained autoregressive WaveNet. However, the KL divergence between the logistic distribution (output in student IAF) and mixture of logistics distribution (output in teacher WaveNet) is intractable, thus one has to rely on Monte Carlo method to approximate the integral. As a result, parallel WaveNet need a double-loop sampling procedure during distillation: 1) draw a white noise sample z and pass it as an input for student-net, then 2) draw multiple different samples from the output distribution of student-net to estimate the intractable KL divergence. In contrast, thanks to the Gaussian setup, the density distillation method in the present disclosure only need to draw one white noise sample z, therefore it provides closed-form computation of the KL divergence. In one or more embodiments, student IAF shares the same conditioner network (layers of transposed 2-D convolution) with teacher WaveNet during distillation. On the other hand, training conditioner network of student model from scratch may lead to worse result.

3.1 Regularized KL Divergence Embodiments

Given a white noise sample z, Methodology 1 outputs the mapped sample x, as well as the output Gaussian distribution $q(x_t|z_{<t};\vartheta)$ with mean $\mu_q$ and standard deviation $\sigma_q$. The sample x may be fed into a Gaussian autoregressive WaveNet, and obtain its output distribution $p(x_t|x_{<t};\theta)$ with mean $\mu_p$ and standard deviation $\sigma_p$. One can show that the reverse KL divergence between the student output distribution $q(x_t|z_{<t};\vartheta)$ and teacher $p(x_t|x_{<t};\theta)$ has closed-form expression, $$KL(q\|p) = \log\frac{\sigma_p}{\sigma_q} + \frac{\sigma_q^2 - \sigma_p^2 + (\mu_p - \mu_q)^2}{2\sigma_p^2}. \tag{11}$$

The detailed derivation is shown in "KL Divergence Between Gaussian Distributions" at the end of this section. In one or more embodiments, bound log $\sigma_p$ and log $\sigma_q$ are lowered at −7 before calculating the KL divergence. However, the division by $\sigma_p^2$ raises serious numerical problem, when the average KL divergence is directly minimized over all time steps. To elaborate this, the empirical histograms of $\sigma_p$ from teacher WaveNet is monitored during distillation, as shown in FIG. 1(a). One can see that it is mostly distributed around ($e^{-9}$, $e^{-2}$), which incurs numerical problem if $\sigma_p$ and $\sigma_q$ have very different magnitudes at the beginning of training. This is because a well-trained WaveNet usually has highly peaked output distributions. The same observation holds true for other output distributions, including mixture of Gaussians and mixture of logistics.

To address this problem, the following variant of KL divergence is defined:

$$KL^{reg}(q\|p) = \lambda|\log\sigma_p - \log\sigma_q|^2 + KL(q\|p). \tag{12}$$

One can interpret the first term as regularization, which largely stabilizes the optimization process by quickly matching the $\sigma$'s from student and teacher models, as demonstrated in FIGS. 1(a) and (b). In one or more experiments, $\lambda$ is fixed at 4. In addition, the regularization does not introduce any bias for matching their probability density functions, as shown in the following proposition:

Proposition 3.1. For probability distributions in the location-scale family (including Gaussian, logistic distribution etc.), the regularized KL divergence in Eq. (12) still satisfies the following properties: (i) $KL^{reg}(q\|p) \geq 0$, and (ii) $KL^{reg}(q\|p) = 0$ if and only if p=q.

In one or more embodiments, the forward KL divergence for probability density distillation is also tested:

$$KL(p\|q) = \mathbb{H}(p,q) - \mathbb{H}(p), \tag{13}$$

where $\mathbb{H}(p,q)$ is the cross entropy between teacher p and student q, and $\mathbb{H}(p)$ is the entropy of teacher model. Note that one may ignore the entropy term $\mathbb{H}(p)$ since student q is optimized under a pre-trained teacher p, which reduces to the typical cross-entropy loss for knowledge distillation. In one or more embodiments, to make it numerically stable, the same regularization term in Eq. (12) is applied and very similar empirical distributions of log $\sigma$ are observed in FIG. 1.

KL Divergence Between Gaussian Distributions:

Given two Gaussian distributions $p(x) = \mathcal{N}(\mu_p, \sigma_p)$ and $q(x) = \mathcal{N}(\mu_q, \sigma_q)$, their KL divergence is:

$$KL(q\|p) = \int q(x)\log\frac{q(x)}{p(x)}dx = \mathbb{H}(q,p) - \mathbb{H}(q) \tag{14}$$

where $\log \equiv \log_e$, the entropy

-continued $$\mathbb{H}(q) = \quad (15)$$
$$-\int q(x)\log q(x)dx = -\int q(x)\log\left[(2\pi\sigma_q^2)^{-\frac{1}{2}}\exp\left(-\frac{(x-\mu_q)^2}{2\sigma_q^2}\right)\right]dx =$$
$$\frac{1}{2}\log(2\pi\sigma_q^2)\int q(x)dx + \frac{1}{2\sigma_q^2}\int q(x)(x-\mu_q)^2 dx =$$
$$\frac{1}{2}\log(2\pi\sigma_q^2)\cdot 1 + \frac{1}{2\sigma_q^2}\sigma_q^2 = \frac{1}{2}\log(2\pi\sigma_q^2) + \frac{1}{2}$$

and the cross entropy, $$\mathbb{H}(q, p) = \quad (16)$$
$$-\int q(x)\log p(x)dx = -\int q(x)\log\left[(2\pi\sigma_p^2)^{-\frac{1}{2}}\exp\left(-\frac{(x-\mu_p)^2}{2\sigma_p^2}\right)\right]dx =$$
$$\frac{1}{2}\log(2\pi\sigma_p^2)\int q(x)dx + \frac{1}{2\sigma_p^2}\int q(x)(x-\mu_p)^2 dx =$$
$$\frac{1}{2}\log(2\pi\sigma_p^2)\int q(x)dx + \frac{1}{2\sigma_p^2}\int q(x)(x^2 - 2\mu_p x + \mu_p^2)dx =$$
$$\frac{1}{2}\log(2\pi\sigma_p^2) + \frac{\mu_q^2 + \sigma_q^2 - 2\mu_p\mu_q + \mu_p^2}{2\sigma_q^2} =$$
$$\frac{1}{2}\log(2\pi\sigma_p^2) + \frac{\sigma_q^2 + (\mu_p - \mu_q)^2}{2\sigma_q^2}.$$

Combining $\mathbb{H}(q)$ and $\mathbb{H}(q,p)$ together, one can obtain $$KL(q\|p) = \log\frac{\sigma_p}{\sigma_q} + \frac{\sigma_q^2 - \sigma_p^2 + (\mu_p - \mu_q)^2}{2\sigma_q^2} \quad (17)$$

3.2 Embodiments of Spectrogram Frame Loss

In knowledge distillation, it is a common practice to incorporate an additional loss using the ground-truth dataset. Indeed, training student IAF with KL divergence loss alone may lead to whisper voices. Oord et al. (2018) advocate the average power loss to solve this issue, which is actually coupled with the short length of training audio clip (i.e., 0.32 s) in their experiments. As the clip length increases, the average power loss will be ineffective. Instead, in one or more embodiments of the present disclosure, the frame-level loss between the output samples x from student IAF and corresponding ground-truth audio $x_n$ are computed as:

$$\frac{1}{B}\||STFT(x)| - |STFT(x_n)|\|_2^2,$$

where $|STFT(x)|$ are the magnitudes of short-term Fourier transform (STFT), and B=1025 is the number of frequency bins as FFT size is set to 2048. In one or more embodiments, a 12.5 ms frame-shift, 50 ms window length and Hanning window are used. In one or more embodiments, a final loss function is a linear combination of average KL divergence and frame-level loss. In one or more experiments, the coefficients for average KL divergence and frame-level loss were set to one.

D. Embodiments of Text-to-Wave Architecture

In this section, embodiments of a convolutional text-to-wave architecture are presented (e.g., FIG. 2), for end-to-end TTS. In one or more embodiments, the architecture is based on a Deep Voice 3 (DV3) embodiment, a convolutional attention-based TTS system. A DV3 embodiment is capable of converting textual features (e.g., characters, phonemes and stresses) into spectral features (e.g., log-mel spectrograms and log-linear spectrograms). These spectral features may be used as inputs for a separately trained waveform synthesis model, such as WaveNet. In contrast, in the text-to-wave architecture embodiments presented herein, the hidden representations learned from the attention mechanism may be directly fed to the neural vocoder through some intermediate processing, and the whole model from scratch may be trained in an end-to-end manner.

Figure 2:
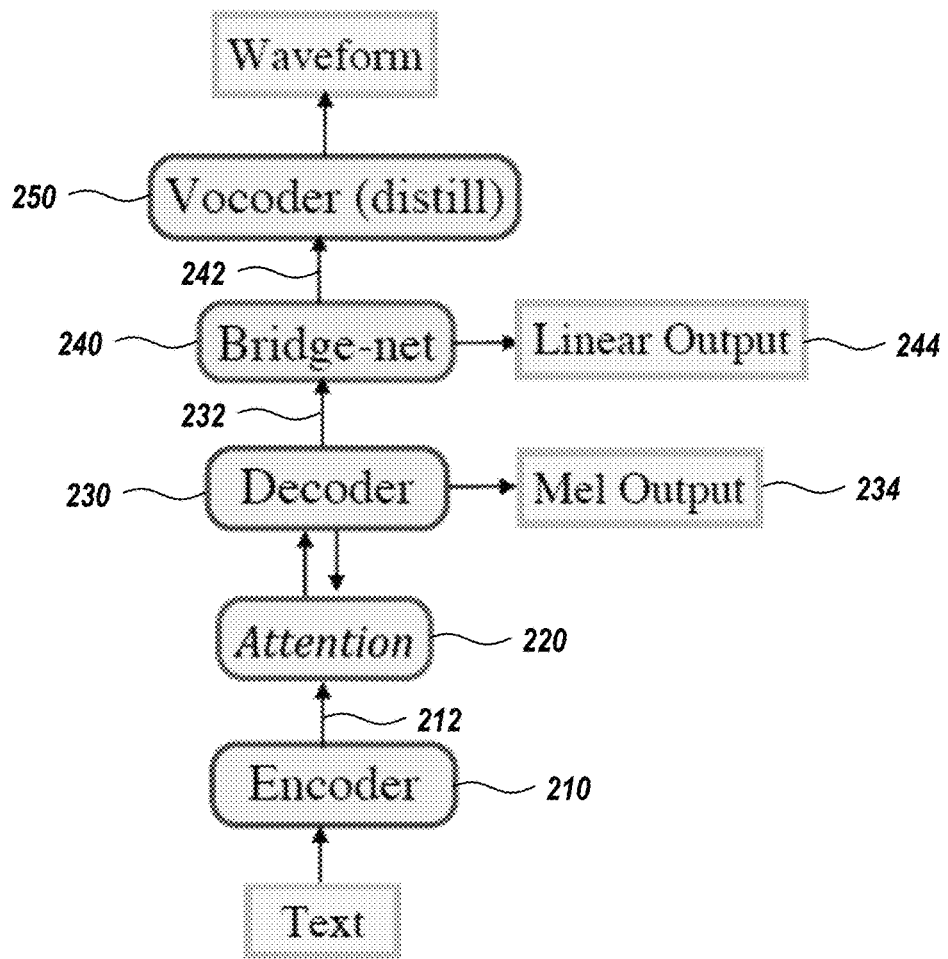
FIG. 2 depicts a text-to-wave architecture to convert textual features into waveform according to embodiments of the present disclosure.

As shown in FIG. 2, the end-to-end text-to-wave architecture comprises four components:

Encoder: A convolutional encoder 210 to textual features into an internal hidden representation 212. In one or more embodiments, the encoder has the similar decoder configuration as in DV3, which is incorporated by reference herein in its entirety.

Decoder: A causal convolutional decoder 230 decodes the encoder representation with attention into the log-mel spectrogram 234 and frame-level hidden representations 232 in an autoregressive manner. In one or more embodiments, decoder 230 may couple to an attention block 220 to implement the decoding operation. In one or more embodiments, the decoder has the similar decoder configuration as in DV3, which is incorporated by reference herein in its entirety.

Bridge-net: A convolutional intermediate processing block 240, which processes the frame-level hidden representation 232 from the decoder and predict log-linear spectrogram 244. Unlike the decoder, it is non-causal and can thus utilize future context. In addition, it upsamples the hidden representation from frame-level to sample-level hidden representations 242.

Vocoder: The vocoder 250 may be use a Gaussian autoregressive WaveNet to synthesize the waveform, which is conditioned on the upsampled hidden representation from the bridge-net 240. This vocoder 250 may also be referred to a student IAF distilled from the autoregressive vocoder.

The overall objective function is a linear combination of the losses from decoder, bridge-net and vocoder. In one or more embodiments, all coefficients are set to one in experiments. The bridge-net is introduced to utilize future temporal information as it can apply non-causal convolution. In one or more embodiments, all modules in the present architecture are convolutional, which enables fast training (e.g., DV3 trains an order of magnitude faster than its RNN peers) and alleviates the common difficulties in RNN-based models (e.g., vanishing and exploding gradient problems). In one or more embodiments, the convolution block from DV3 (see FIG. 8) is used as the basic building block throughout the whole model. It comprises a 1-D convolution with a gated linear unit (GLU) and a residual connection. In one or more embodiments, the dropout probability is set to 0.05 in all experiments. Further details are given in the following subsections.

1. Encoder-Decoder Embodiments

In one or more embodiments, the same encoder-decoder architecture as a DV3 embodiment is used. The encoder first converts characters or phonemes into trainable embeddings, followed by a series of convolution blocks to extract long-range textual information. The decoder autoregressively predicts the log-mel spectrograms with an L1 loss (teacher-forced at training). It starts with layers of 1×1 convolution to preprocess the input log-mel spectrogram, and then applies a series of causal convolutions and attentions. A multi-hop attention-based alignment is learned between character embeddings and log-mel spectrograms.

Figure 3:
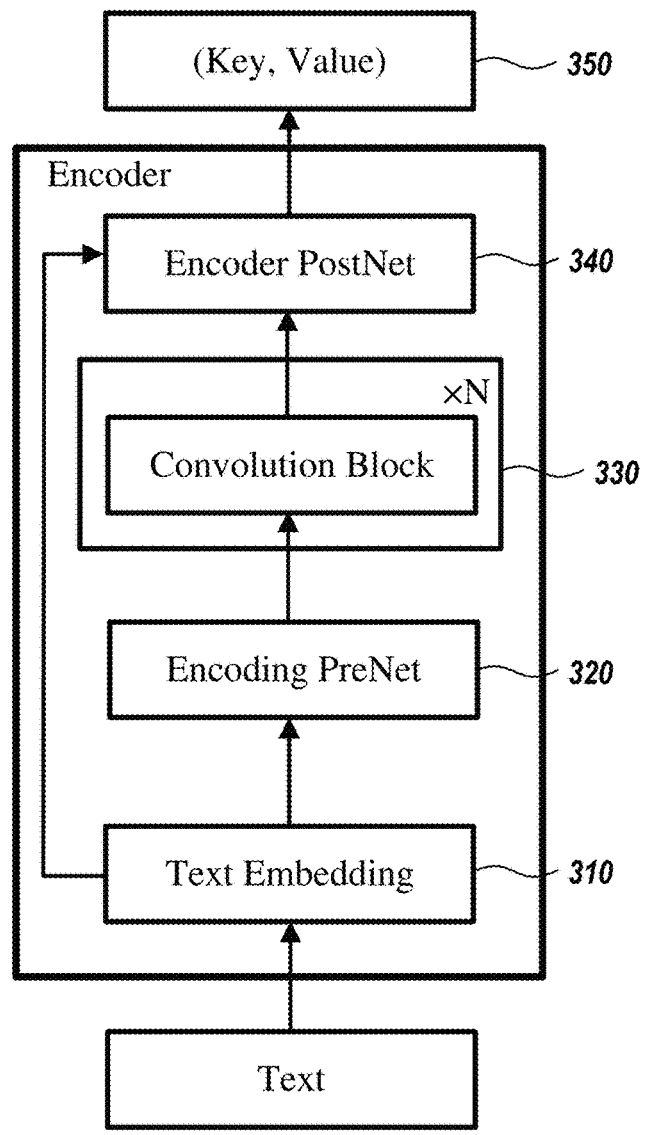
FIG. 3 depicts a block diagram for the encoder in the text-to-wave architecture according to embodiments of the present disclosure.

FIG. 3 depicts a block diagram for the encoder in the text-to-wave architecture according to embodiments of the present disclosure. The encoder encodes text into per-timestep key and value vectors 350 for an attention-based decoder. The encoder comprises an embedding model 310, an encoding PreNet 320, one or more convolution blocks 330, and an encoding PostNet 340. The embedding model 310 converts an input text into text embedding representations. The PreNet 320 preprocesses the text embedding representations. The one or more convolution blocks 330 receive projections of the preprocessed text embedding representations and process them to extract time-dependent text information from the input text. The PostNet 340 receives output from the convolution blocks 330 to form per-timestep key and value vectors 350 for the attention-based decoder. In one or more embodiments, the PostNet 340 also receives the embedding output from 310 and adds it directly to form per-timestep key and value vectors 350.

Figure 4:
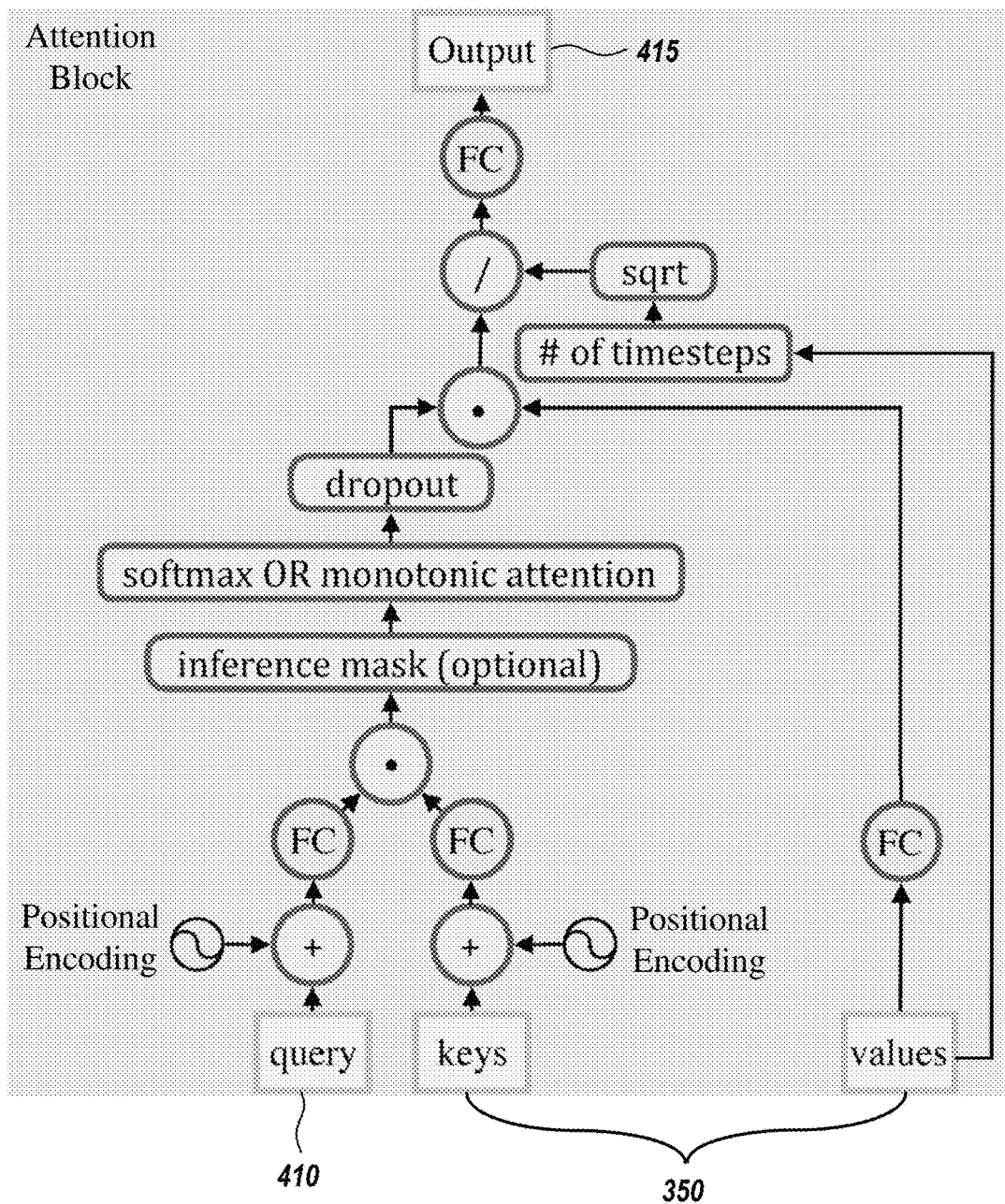
FIG. 4 depicts a block diagram for the attention block in the text-to-wave architecture according to embodiments of the present disclosure.

FIG. 4 depicts a block diagram for the attention block in the text-to-wave architecture according to embodiments of the present disclosure. In one or more embodiments, the attention block uses a query vector 410 (hidden states of the decoder) and the per-timestep key and value vectors 350 from the encoder to compute attention weights, and then outputs a context vector 415 computed as the weighted average of the value vectors. In one or more embodiments, forced monotonocity may be applied at inference by adding a mask of large negative values to the logits. In one or more embodiments, only softmax attention scheme is used. In one or more embodiments, during training, attention weights are dropped out.

Figure 5:
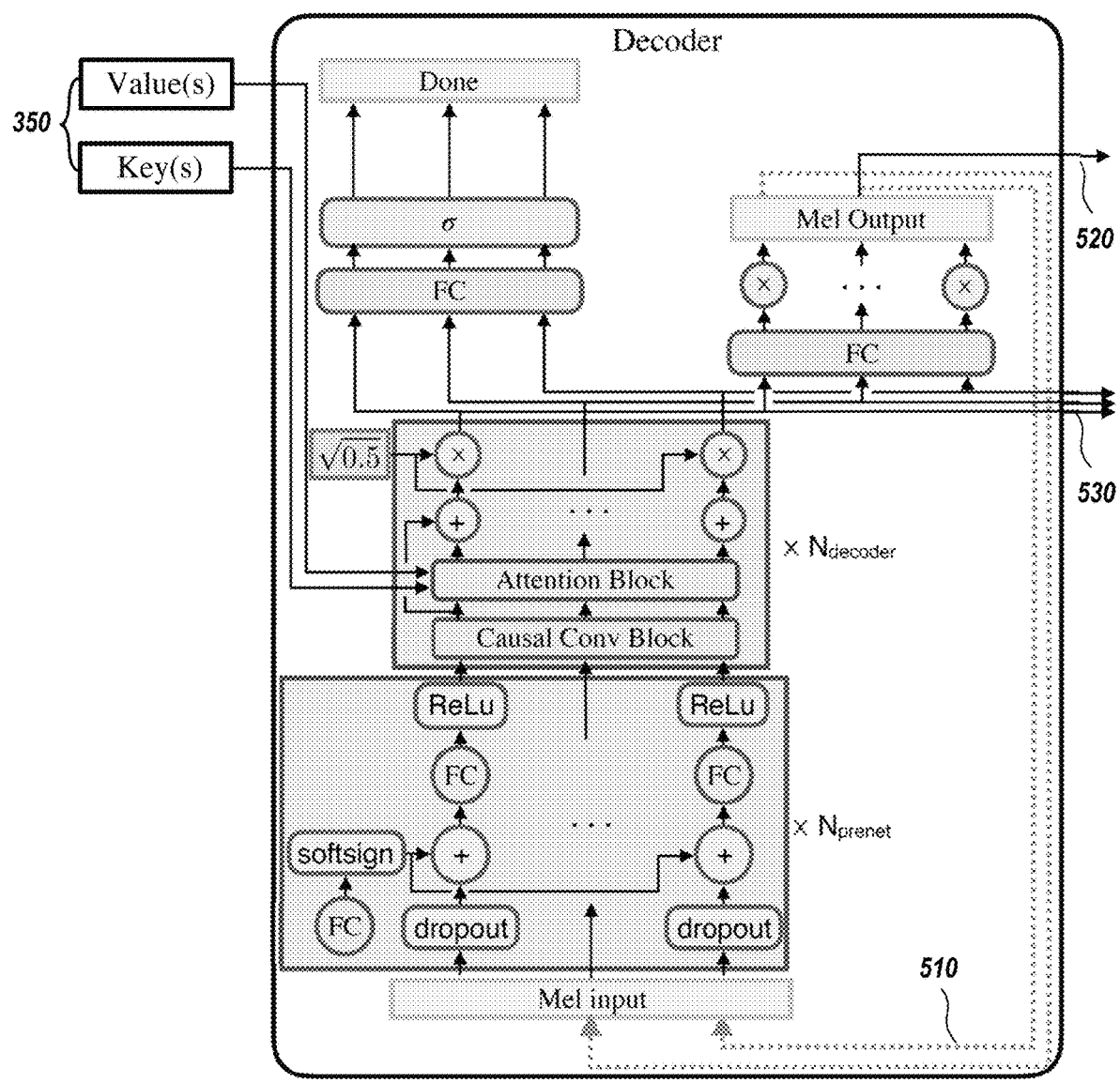
FIG. 5 depicts a block diagram for the decoder in the text-to-wave architecture according to embodiments of the present disclosure.

FIG. 5 depicts a block diagram for the decoder in the text-to-wave architecture according to embodiments of the present disclosure. The decoder uses the per-timestep key and value vectors 350 to predict the mel-band log magnitude spectrograms 520 that correspond to the output audio. The dotted arrows 510 depict the autoregressive synthesis process during inference. In one or more embodiments, the decoder outputs frame-level hidden state 530 to the bridge-net 240 for further processing. In one or more embodiments, the decoder has one or more components similar to the decoder disclosed in DV3, which provides additional details of the decoder is incorporated by reference herein in its entirety.

2. Bridge-Net Embodiments

Figure 6:
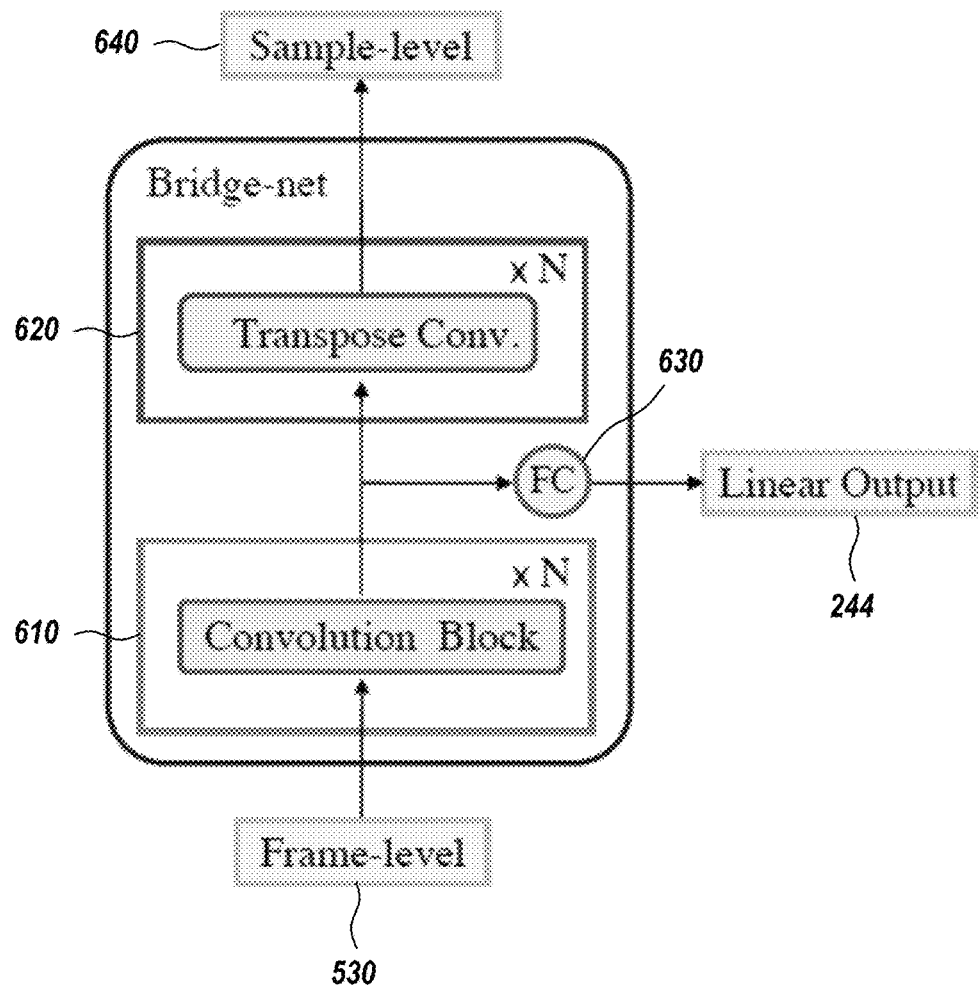
FIG. 6 depicts a block diagram for the Bridge-Net in the text-to-wave architecture according to embodiments of the present disclosure.

FIG. 6 depicts a block diagram for the Bridge-Net in the text-to-wave architecture according to embodiments of the present disclosure. The frame-level hidden states 530 of the decoder are fed to the bridge-net for temporal processing and upsampling. The output sample-level hidden representation 640 is then fed to the vocoder for waveform synthesis. In one or more embodiments, the Bridge-net comprises a stack of convolution blocks 610, and multiple layers (e.g. 2 layers) of transposed 2-D convolution layers 620 interleaved with softsign non-linearities to upsample the per-timestep hidden representation from 80 per second to 24,000 per second. In one or more embodiments, the same transposed convolution strides and filter sizes described in Section C.1 are used. The convolution blocks 610 also output log-linear spectrogram 244 via one or more fully connected (FC) layers 630.

Figure 7:
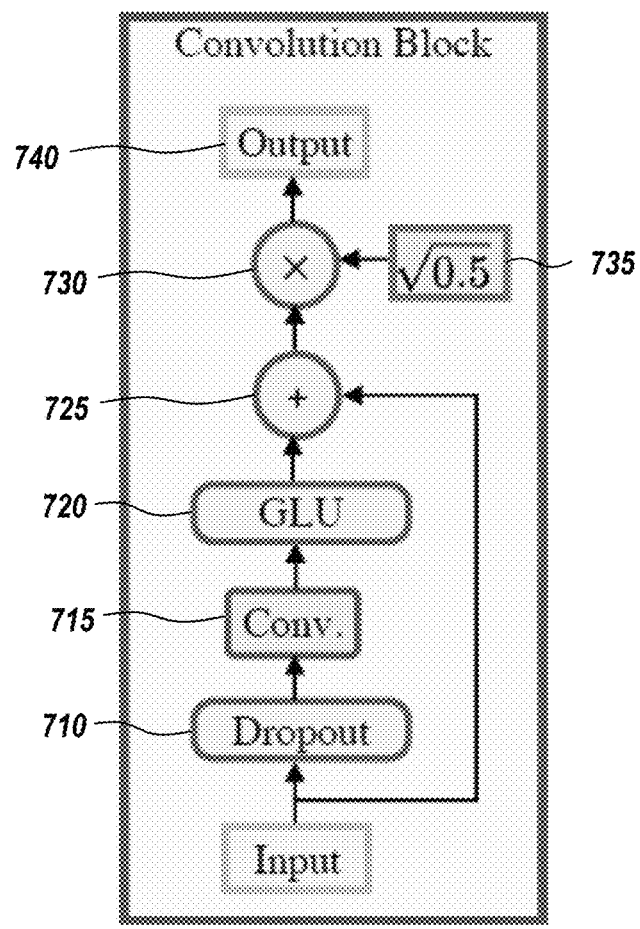
FIG. 7 depicts a block diagram for the convolution block based on gated linear unit (GLU) in the Bridge-Net according to embodiments of the present disclosure.

FIG. 7 depicts a block diagram for the Convolution Block based on gated linear unit (GLU) in the Bridge-Net according to embodiments of the present disclosure. In one or more embodiments, the convolution block comprises a dropout module 710, a convolution filter 715 (which may be one-dimensional), a gated-linear unit 720 as a learnable nonlinearity, a residual connection 725 to the input (the frame-level hidden states from decoder), and a scaling block 730 with a scaling factor. In the depicted embodiment, the scaling factor is $\sqrt{0.5}$, although different values may be used. The scaling factor helps ensures that the input variance is preserved early in training. The gated linear unit 720 provides a linear path for the gradient flow, which alleviates the vanishing gradient issue for stacked convolution blocks while retaining non-linearity. In one or more embodiments, the convolution filter weights are initialized with zero-mean and unit-variance activations throughout the entire network. In one or more embodiments, dropout 710 is applied to the inputs prior to the convolution for regularization. In one or more embodiments, the convolutions in the architecture may be either non-causal or causal.

Figure 8:
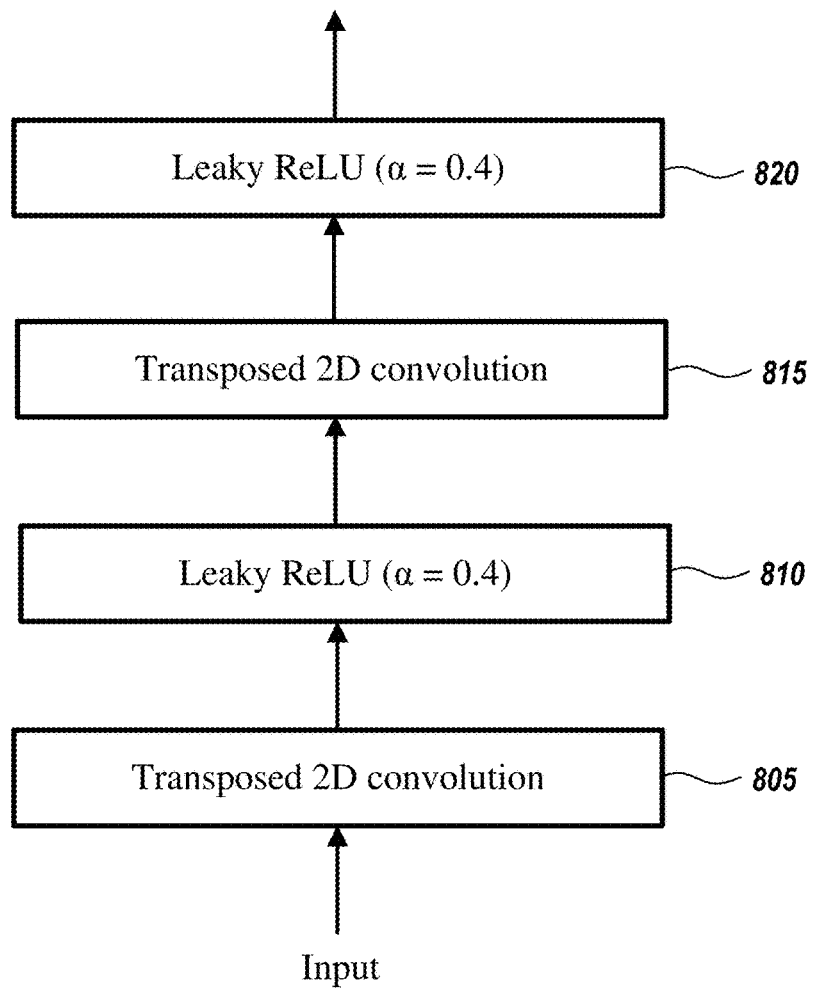
FIG. 8 depicts a block diagram for the transposed convolution block in the Bridge-Net according to embodiments of the present disclosure.

FIG. 8 depicts a block diagram for the transposed convolution block in the Bridge-Net according to embodiments of the present disclosure. The transposed convolution block comprise two layers (805 and 815) of transposed 2-D convolution (in time and frequency) interleaved with two leaky ReLU ($\alpha=0.4$) (810 and 820) for upsampling the conditioner from frame-level (e.g. 80 per second) to sample-level (e.g. 24,000 per second). The transposed convolution block receives input from the convolution block 610 and outs sample-level hidden representations to the vocoder for further processing. In one or more embodiments, the upsampling strides in time are 15 and 20 for the two layers, respectively. Correspondingly, the 2-D convolution filter sizes are set as (30, 3) and (40, 3), where the filter sizes (in time) are doubled from strides to avoid the checkerboard artifacts. It shall be noted that the configurations are for illustration and not limitation; one skilled in the art shall recognize that the specific values in FIG. 8 are for example only.

3. Vocoder Embodiments

The vocoder may function as both a teacher and a student for the text-to-wave model. When the text-to-wave model is trained in a first training step, the vocoder is a Gaussian autoregressive WaveNet synthesizing the waveform conditioned on the upsampled hidden representation from the bridge-net. In a second training step, the vocoder is referred to a student IAF distilled from the autoregressive vocoder trained during the first step.

FIG. 9 depicts a block diagram for the Vocoder in the text-to-wave architecture according to embodiments of the present disclosure. The Vocoder receives audio input (which may be normalized to [−1.0, 1.0], and/or sample-level hidden representation from the transpose convolution block of the bridge-net. In one or more embodiments, the vocoder comprises input convolutions 932, 948, 950, 964, and 970; unary operation blocks 924, 942, 946, 962, and 968; softmax 972; binary operation blocks 938, 940, 944, 952, and 960; and split channels are 934 and 936. The network details are described in the following subsections. It shall be noted that the configurations are for illustration and not limitation; one skilled in the art shall recognize that the specific values in FIG. 9 are for example only. In one or more embodiments, the vocoder has one or more components similar to the vocoder disclosed in DV1, which is incorporated by reference herein in its entirety.

In one or more embodiments, the Vocoder outputs a single Gaussian distribution $\mathcal{N}(\mu, \sigma)$ from the convolution layer 970. When the text-to-wave mode is trained in the first step from scratch, the vocoder operates as a Gaussian autoregressive WaveNet and services as a teacher network. The Gaussian autoregressive WaveNet outputs a first (teacher) Gaussian distribution $\mathcal{N}(\mu, \sigma)$. When the text-to-wave mode is trained in the second step, the vocoder operates as a student IAF and services as a student network. The student IAF is distilled from the trained Gaussian autoregressive WaveNet. The student IAF outputs a second (student) Gaussian distribution $\mathcal{N}(\mu, \sigma)$ using Gaussian IAF. The first and second Gaussian distributions are used to form a loss function between the distributions for training model training. Details of the Gaussian WavNet and the student IAF may be found at section C.1 and C.2 respectively. Details of the loss functions used for model training may be found at section C.3.

Figure 10:
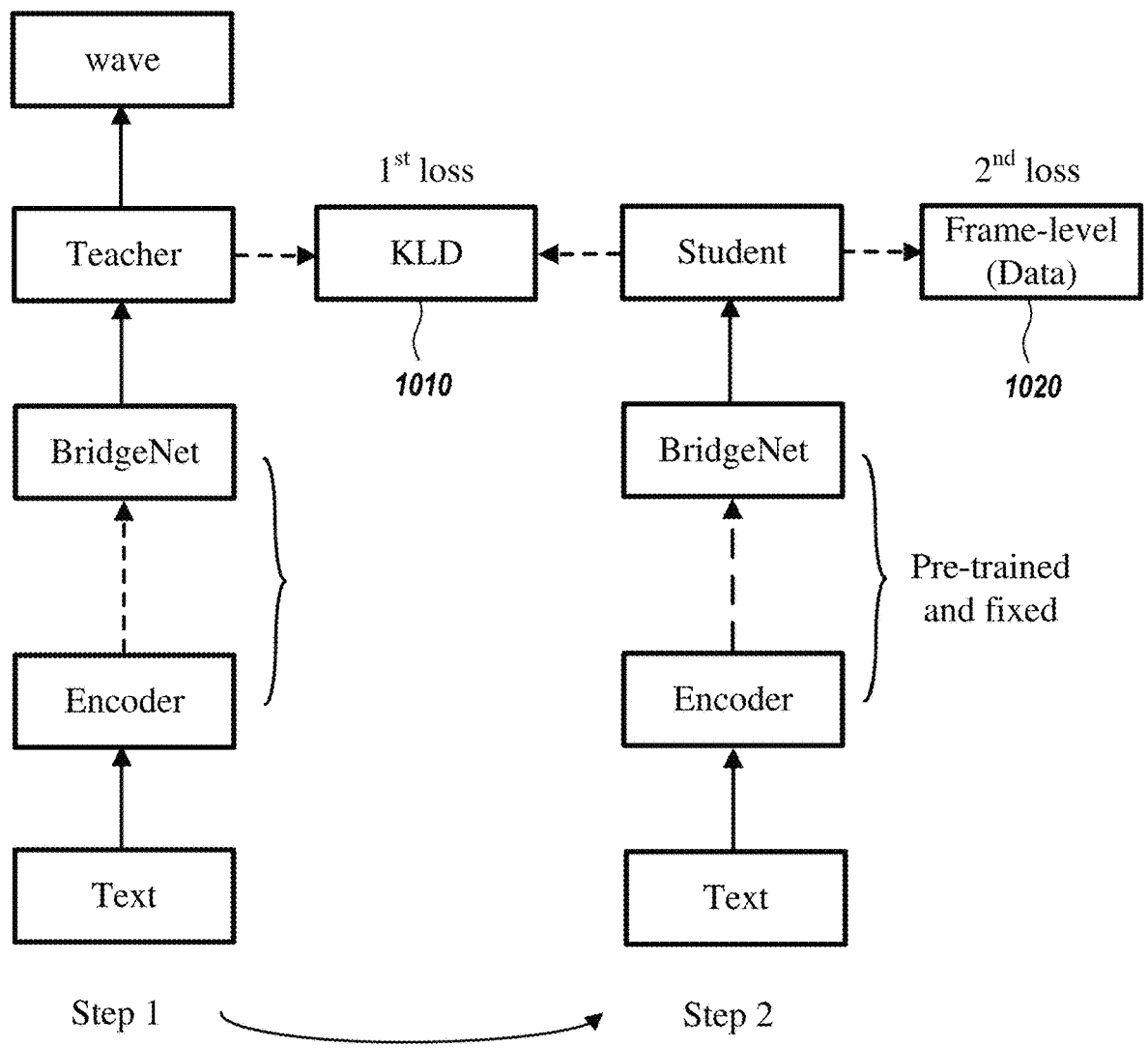
FIG. 10 graphically depicts a training process for an end-to-end text-to-speech framework according to embodiments of the present disclosure.

FIG. 10 graphically depicts a training process for an end-to-end text-to-speech framework according to embodiments of the present disclosure. When the text-to-wave mode is trained in the first step from scratch, the vocoder operates as a Gaussian autoregressive WaveNet and services as a teacher network. The Gaussian autoregressive WaveNet outputs a first (teacher) Gaussian distribution $\mathcal{N}(\mu, \sigma)$. When the text-to-wave mode is trained in the second step, the vocoder operates as a student IAF and services as a student network. The student IAF is distilled from the trained Gaussian autoregressive WaveNet. The student IAF outputs a second (student) Gaussian distribution $\mathcal{N}(\mu, \sigma)$ using Gaussian IAF. The first and second Gaussian distributions are used to form a first loss function 1010 between the distributions for training model training. In one or more embodiments, a second loss function 1020 (spectrogram frame-level loss using ground-truth dataset) is also used for student IAF (or the overall text-to-wave model training). In one or more embodiments, the encoder, the decoder, and the convolutional processing block are pre-trained and have parameters fixed when the student IAF is distilled from the Gaussian autoregressive WaveNet during the distillation.

Figure 11:
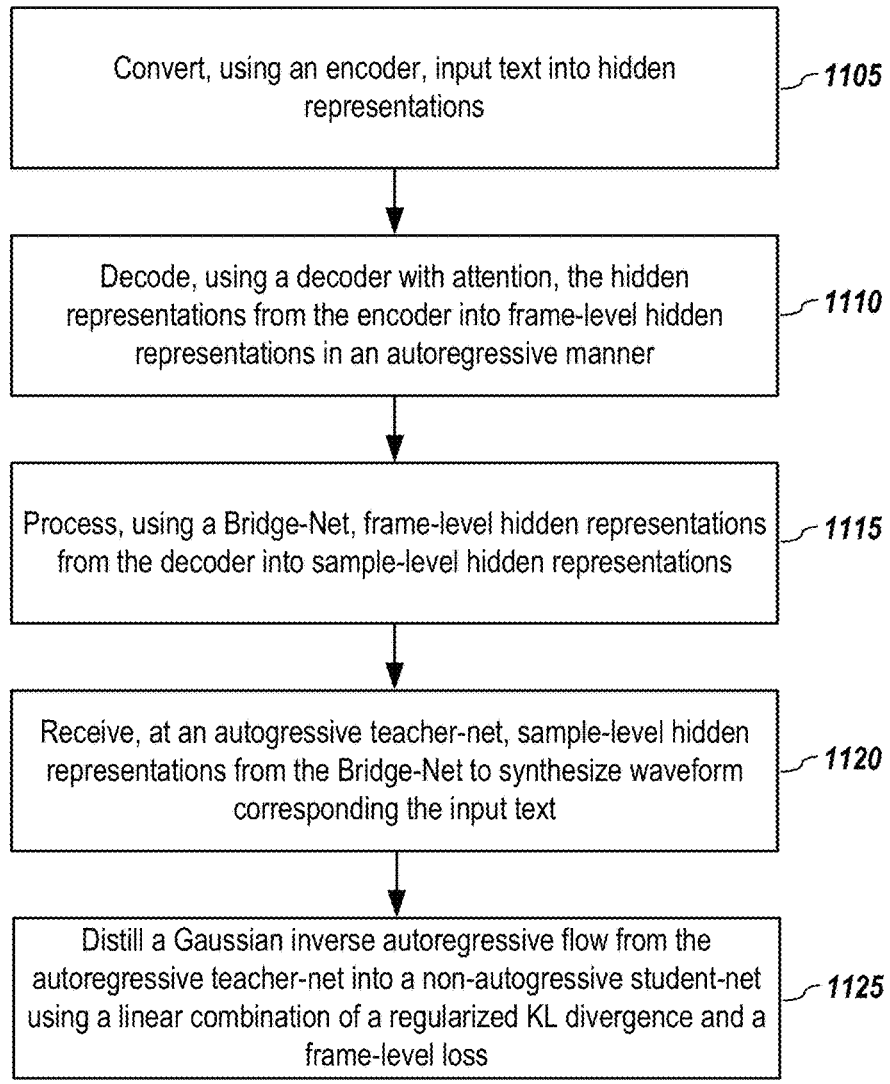
FIG. 11 depicts a method to train the end-to-end text-to-speech framework according to embodiments of the present disclosure.

FIG. 11 depicts a method corresponding to the training process in FIG. 10, according to embodiments of the present disclosure. An input text is firstly converted (1105) into hidden representations using an encoder. The hidden representations from the encoder is decoded (1110) using a decoder with attention into frame-level hidden representations. A convolutional intermediate processing block (Bridge-Net) processes (1115) the frame-level hidden representation from the decoder to predict log-linear spectrogram and upsamples the hidden representation from frame-level to sample-level hidden representations. An autoregressive vocoder, serving as a teacher network (Gaussian WaveNet), receives (1120) the sample-level hidden representations to synthesize waveform corresponding to the input text. A Gaussian IAF is distilled (1125) from the autoregressive vocoder into a non-autoregressive student network by minimizing a linear combination of a regularized Kullback-Leibler (KL) divergence (between output distributions of the teacher network and student network) and a spectrogram frame-level loss (using ground-truth dataset) for improved performance, e.g., minimizing or preventing whisper voices. In one or more embodiments, the KL divergence and frame-level loss may be applied in combination at the same time.

Figure 12:
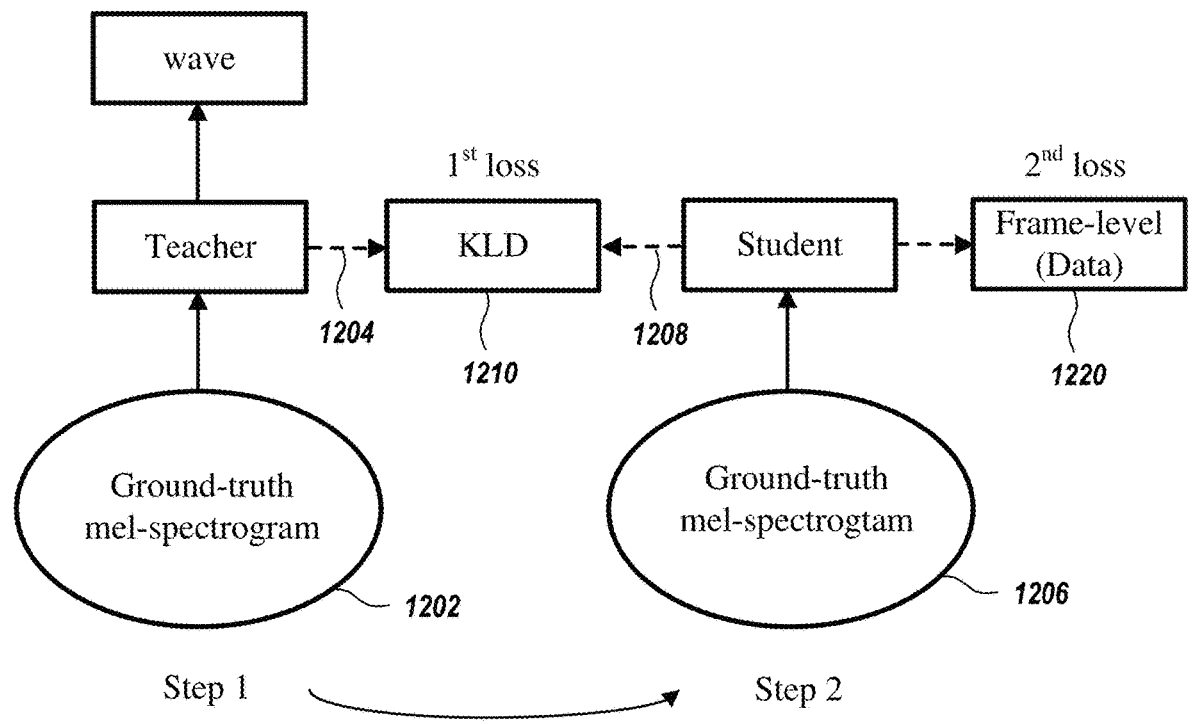
FIG. 12 graphically depicts a training process for a vocoder in the end-to-end text-to-speech framework according to embodiments of the present disclosure.

Alternatively, the Gaussian autoregressive WaveNet may be trained separately conditioned on ground-truth mel-spectrogram instead of trained with encoder-decoder. Similarly, the student IAF may be distilled from such a pre-trained Gaussian autoregressive WaveNet. FIG. 12 graphically depicts such an alternative training process for a vocoder in the end-to-end text-to-speech framework according to embodiments of the present disclosure. The teacher network (Gaussian autoregressive WaveNet) receives ground truth mel-spectrogram input 1202 and output an audio wave corresponding to the input text and also a first output distribution (a single Gaussian output distribution) 1204. A student network (non-autoregressive Gaussian IAF) is distilled from the teacher network. The student network outputs a second output distribution 1208, which is also a single Gaussian output distribution. Both output distributions are used to compute a regularized Kullback-Leibler (KL) divergence between output distributions, for student network training. Similar to FIG. 10, the student network in FIG. 12 may be trained by minimizing a linear combination of a regularized Kullback-Leibler (KL) divergence (between output distributions of the teacher network and student network) and a spectrogram frame-level loss (using ground-truth dataset) for improved performance.

Figure 13:
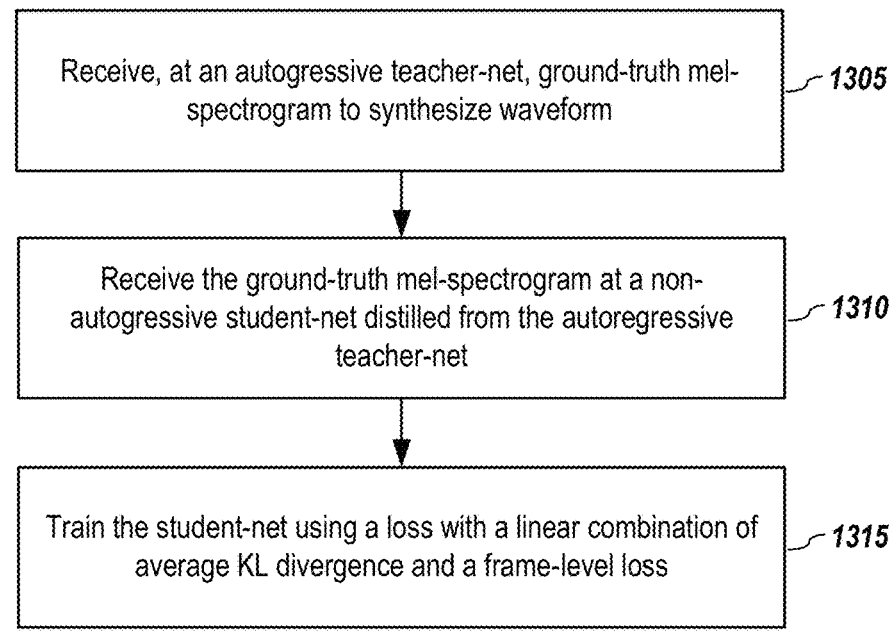
FIG. 13 depicts a method to train the vocoder in the end-to-end text-to-speech framework according to embodiments of the present disclosure.

FIG. 13 depicts a method to train the vocoder corresponding to the training process in FIG. 12 according to embodiments of the present disclosure. An autoregressive teacher vocoder (Gaussian WaveNet) receives (1305) ground-truth spectrogram to synthesize waveform and outputs a first output distribution. A non-autoregressive student vocoder, distilled from the Gaussian IAF, also receives (1310) ground-truth spectrogram and outputs a second output distribution. The student network is trained (1315) using a loss with a linear combination of a spectrogram frame-level loss and a regularized Kullback-Leibler (KL) divergence between output distributions of the teacher network and student network. The spectrogram frame-level loss may be obtained using ground-truth dataset. In one or more embodiments, the combination coefficients for the KL divergence and the frame-level loss are set to one.

E. Some Experiments

In this section, several experiments are presented to evaluate the presented parallel wave generation method and text-to-wave architecture. It shall be noted that these experiments and results are provided by way of illustration and were performed under specific conditions using a specific embodiment or embodiments; accordingly, neither these experiments nor their results shall be used to limit the scope of the disclosure of the current patent document.

Data: An internal English speech dataset containing about 20 hours of audio from a female speaker with a sampling rate of 48 kHz is used. The audios are downsampled to 24 kHz.

Autoregressive WaveNet: In the present patent document, it is firstly shown that that a single Gaussian output distribution for autoregressive WaveNet suffices to model the raw waveform. In one or more embodiments, 20-layers WaveNets are trained conditioned on 80-band ground-truth log-mel spectrogram with various output distributions, including single Gaussian, 10-component mixture of Gaussians (MoG), 10-component mixture of Logistics (MoL), and softmax with 2048 linearly quantized channels. Both residual channel (dimension of the hidden state of every layer) and skip channel (the dimension to which layer outputs are projected prior to the output layer) are set to 128. The filter size of dilated convolutions is set to 2 for teacher WaveNet. All models share the same architecture except the output distributions, and they are trained for 500K steps using the Adam optimizer with batch-size 8 and 0.5 s audio clips. The learning rate is set to 0.001 in the beginning and annealed by half for every 200K steps. The mean opinion score (MOS) for naturalness evaluation is reported in Table 1. The results indicate that the Gaussian autoregressive WaveNet provides comparable results to MoG and softmax outputs, and outperforms MoL in various experiments. In experiments, it is found that MoL is more sensitive to architecture modifications than others.

Student Gaussian IAF: In one or more embodiments, a 60-layer parallel student-net is distilled from the 20-layer Gaussian autoregressive WaveNet. It comprises six stacked Gaussian inverse autoregressive flows and each flow is parameterized by a 10-layer WaveNet with 128 residual and skip channels. The filter size of dilated convolutions is set to 3 in student WaveNet. Usually the IAFs need larger receptive fields than the autoregressive models. In one or more embodiments, both the forward and reverse KL divergences are tested combined with the frame-loss, and their combination coefficients are simply set to one in one or more experiments. The student models are trained for 500K steps using Adam optimizer. The learning rate is set to 0.001 in the beginning and annealed by half for every 200K steps. Surprisingly, good results are always found after only 50K steps of distillation, which perhaps benefits from the closed-form computation of KL divergence. The models are trained longer for extra improvement. The MOS evaluation results are reported in Table 2. Both of these distillation methods work well and obtain comparable results. Further improvements are expected by incorporating perceptual and contrastive losses.

TABLE 1

Mean Opinion Score (MOS) ratings with 95% confidence intervals using different output distributions for autoregressive WaveNet. CrowdMOS toolkit (Ribeiro et al., CrowdMOS: An approach for crowdsourcing mean opinion score studies. ICASSP, 2011) is used, where batches of samples from these models were presented to workers on Mechanical Turk. Since batches contain samples from all models, the results naturally induce a comparison between different models.

| Output Distribution | Subjective 5-scale MOS |
| --- | --- |
| Gaussian | 4:40 ± 0:20 |
| Mixture of Gaussians | 4:38 ± 0:22 |
| Mixture of Logistics | 4:03 ± 0:27 |
| Softmax (2048-way) | 4:31 ± 0:23 |
| Ground-truth (24 kHz) | 4:54 ± 0:12 |

TABLE 2

Mean Opinion Score (MOS) ratings with 95% confidence intervals using different distillation objective functions for student Gaussian IAF. The CrowdMOS toolkit as in Table 1 is used.

| Distillation method | Subjective 5-scale MOS |
| --- | --- |
| Reverse Kreg + Frame-loss | 4:16 ± 0:21 |
| Forward Kreg + Frame-loss | 4:12 ± 0:20 |

Text-to-Wave Model: In one or more embodiments, the proposed text-to-wave model is trained from scratch and compare it with the separately trained pipeline presented in Deep Voice 3 (DV3). The proposed text-to-wave model uses the same text preprocesssing and joint character-phoneme representation in DV3. The hyper-parameters of encoder and decoder are the same as the single-speaker DV3. The bridge-net has 6 layers of convolution blocks with input/output size of 256. The hyper-parameters of the vocoder are the same as 20-layer Gaussian autoregressive WaveNet. The model is trained for 1.5M steps using Adam optimizer. The learning rate is set to 0.001 in the beginning and annealed by half for every 500K steps. A Gaussian IAF is also distilled from the autoregressive vocoder within this end-to-end model. Both student IAF and autoregressive vocoder are conditioned on the upsampled hidden representation from the bridge-net. For the separately trained pipeline, two Gaussian autoregressive WaveNets are trained conditioned on ground-truth mel-spectrogram and predicted mel-spectrogram from DV3, respectively. Inference is run on the same unseen text as DV3 and report the MOS results in Table 3. The results demonstrate that the text-to-wave model significantly outperforms the separately trained pipeline. In addition, the text-to-wave model with a distilled parallel vocoder gives comparable result to the one with autoregressive neural vocoder. In the separately trained pipeline, training a WaveNet conditioned on predicted mel-spectrograms eases the training/test mismatch, thus slightly outperforms training with ground-truth.

TABLE 3

Mean Opinion Score (MOS) ratings with 95% confidence intervals for comparing the text-to-wave model and separately trained pipeline. The crowdMOS toolkit as in Table 1 is used.

| Method | Subjective 5-scale MOS |
| --- | --- |
| Text-to-Wave Model | 4:15 ± 0:25 |
| Text-to-Wave (distilled vocoder) | 4:11 ± 0:24 |
| DV3 + WaveNet (predicted Mel) | 3:81 ± 0:26 |
| DV3 + WaveNet (true Mel) | 3:73 ± 0:24 |

F. Some Conclusions

Presented herein are embodiments of a neural text-to-speech system based on a novel parallel wave generation methodology with Gaussian inverse autoregressive flow. In the present patent document, it is demonstrated that a single Gaussian output distribution is sufficient for modeling the raw waveform in WaveNet without degeneration of audio quality. Then, a parallel wave generation methodology based on Gaussian inverse autoregressive flow (IAF) is presented. The IAF is distilled from the autoregressive WaveNet by minimizing a novel regularized KL divergence for highly peaked distributions. In contrast to parallel WaveNet, the presented distillation methodology estimates the KL divergence in closed-form and largely stabilizes the training procedure. Furthermore, in the present patent document, the first text-to-wave neural architecture for TTS is disclosed. Such a neural architecture may be trained from scratch in an end-to-end manner. The presented text-to-wave architecture outperforms the separately trained pipeline and opens up the research opportunities for fully end-to-end TTS. Appealing results by distilling a parallel neural vocoder conditioned on the hidden representation within the end-to-end model are also presented.

G. System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 14:
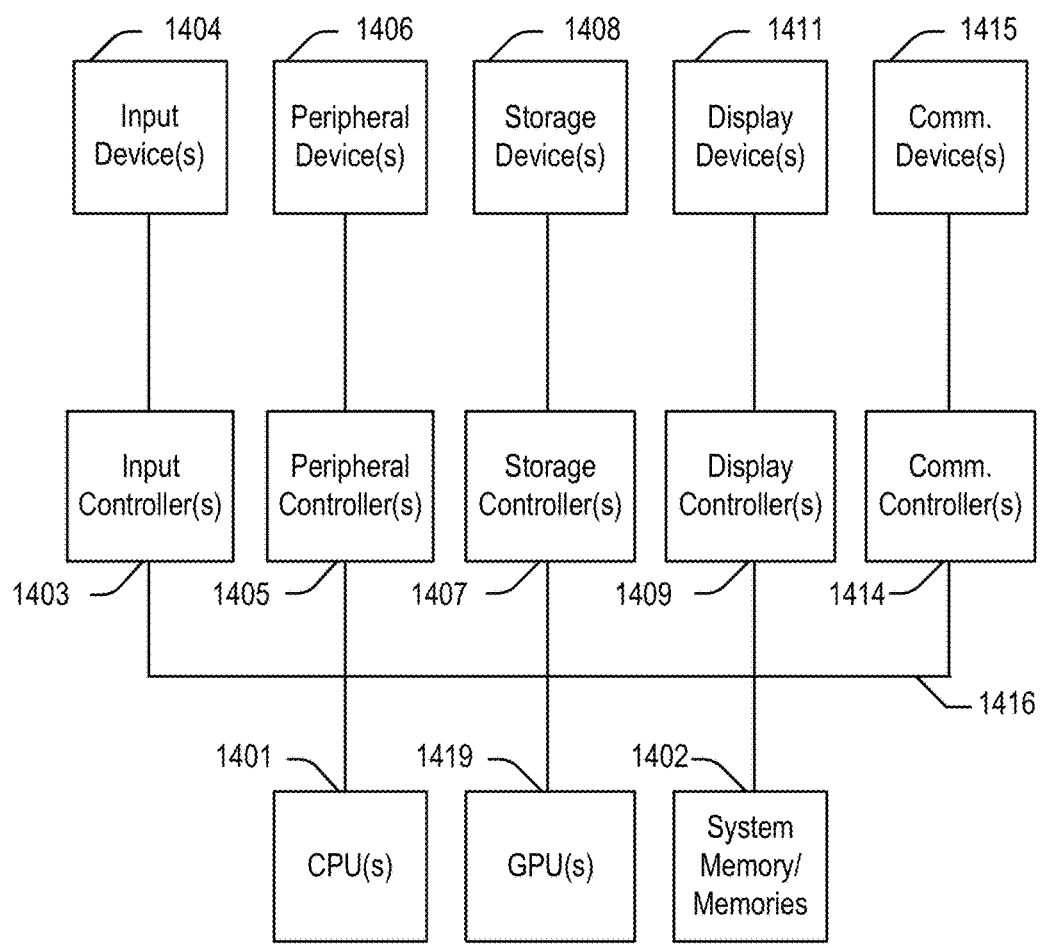
FIG. 14 depicts a simplified block diagram of a computing device/information handling system, in accordance with embodiments of the present disclosure.

FIG. 14 depicts a simplified block diagram of a computing device/information handling system (or computing system) according to embodiments of the present disclosure. It will be understood that the functionalities shown for system 1400 may operate to support various embodiments of a computing system—although it shall be understood that a computing system may be differently configured and include different components, including having fewer or more components as depicted in FIG. 14.

As illustrated in FIG. 14 the computing system 1400 includes one or more central processing units (CPU) 1401 that provides computing resources and controls the computer. CPU 1401 may be implemented with a microprocessor or the like, and may also include one or more graphics processing units (GPU) 1419 and/or a floating-point coprocessor for mathematical computations. System 1400 may also include a system memory 1402, which may be in the form of random-access memory (RAM), read-only memory (ROM), or both.

A number of controllers and peripheral devices may also be provided, as shown in FIG. 14. An input controller 1403 represents an interface to various input device(s) 1404, such as a keyboard, mouse, touchscreen, and/or stylus. The computing system 1400 may also include a storage controller 1407 for interfacing with one or more storage devices 1408 each of which includes a storage medium such as magnetic tape or disk, or an optical medium that might be used to record programs of instructions for operating systems, utilities, and applications, which may include embodiments of programs that implement various aspects of the present invention. Storage device(s) 1408 may also be used to store processed data or data to be processed in accordance with the invention. The system 1400 may also include a display controller 1409 for providing an interface to a display device 1411, which may be a cathode ray tube (CRT), a thin film transistor (TFT) display, organic light-emitting diode, electroluminescent panel, plasma panel, or other type of display. The computing system 1400 may also include one or more peripheral controllers or interfaces 1405 for one or more peripherals 1406. Examples of peripherals may include one or more printers, scanners, input devices, output devices, sensors, and the like. A communications controller 1414 may interface with one or more communication devices 1415, which enables the system 1400 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1416, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A text-to-waveform neural network system comprising:
   an encoder that receives an input text and converts the input text into encoder representations;
   a decoder that autoregressively decodes the encoder representations into decoder representations;
   a convolutional block network that processes the decoder representations from the decoder into hidden representations; and
   a vocoder that synthesizes a waveform corresponding to the input text using hidden representations from the convolutional block network,
   wherein the vocoder of the text-to-waveform neural network system was trained using a loss that comprises a divergence loss, which is obtained by minimizing a regularized Kullback-Leibler (KL) divergence between output distributions of an autoregressive vocoder, which was pre-trained, and the vocoder for a set of training data.

2. The text-to-waveform neural network system of claim 1 wherein the loss further comprises a frame-level loss using a comparison between waveforms generated by the vocoder using texts from the set of training data and corresponding ground-truth waveforms from the set of training data.

3. The text-to-waveform neural network system of claim 1 wherein the output distribution of the autoregressive vocoder is a single Gaussian distribution.

4. The text-to-waveform neural network system of claim 1 wherein the regularized KL divergence is obtained in a closed-form.

5. The text-to-waveform neural network system of claim 1 wherein the encoder, the decoder, and the convolutional block network are pre-trained with the autoregressive vocoder to fix parameters of the encoder, the decoder, and the convolutional block network.

6. The text-to-waveform neural network system of claim 1 wherein the convolutional block network upsamples the decoder representations from the decoder into the hidden representations.

7. The text-to-waveform neural network system of claim 1 wherein the vocoder is a non-autoregressive model.

8. A method for generating an audio waveform for an input text using a text-to-waveform neural network system, the method comprising:
   receiving the input text into the text-to-waveform neural network system, which comprises:
       an encoder that receives the input text and converts the input text into encoder representations;
       a decoder that autoregressively decodes the encoder representations into decoder representations;
       a convolutional block network that processes the decoder representations from the decoder into hidden representations; and
       a vocoder that synthesizes a waveform corresponding to the input text using the hidden representations from the convolutional block network, wherein the vocoder of the text-to-waveform neural network system was trained using a loss that comprises a divergence loss, which is obtained by minimizing a regularized Kullback-Leibler (KL) divergence between output distributions of an autoregressive vocoder, which was pretrained, and the vocoder for a set of training data; and
   outputting from the text-to-waveform neural network system the audio waveform corresponding to the input text.

9. The method of claim 8 wherein the loss further comprises a frame-level loss using a comparison between waveforms generated by the vocoder using texts from the set of training data and corresponding ground-truth waveforms from the set of training data.

10. The method of claim 8 wherein the output distribution of the autoregressive vocoder is a single Gaussian distribution.

11. The method of claim 8 wherein the regularized KL divergence is obtained in a closed-form.

12. The method of claim 8 wherein the encoder, the decoder, and the convolutional block network are pre-trained with the autoregressive vocoder to fix the parameters of the encoder, the decoder, and the convolutional block network during training of the vocoder.

13. The method of claim 8 wherein the convolutional block network upsamples the decoder representations from the decoder into the hidden representations.

14. The method of claim 8 wherein the vocoder is a non-autoregressive model.

15. A computer-implemented method for training a text-to-waveform system to synthesize speech from an input text, comprising:
   encoding, via an encoder comprising one or more convolutional blocks, the input text into encoder hidden representations;
   autoregressively decoding, using a decoder, the encoder hidden representations with attention into frame-level hidden representations;
   processing, using a convolutional processing block, the frame-level hidden representations into sample-level hidden representations;
   generating, using an autoregressive vocoder, synthesized waveforms corresponding to the input text conditioned on the sample-level hidden representations; and
   using the autoregressive vocoder to obtain a vocoder using a loss comprising a divergence loss obtained using a regularized Kullback-Leibler (KL) divergence between output distributions of the autoregressive vocoder and the vocoder.

16. The computer-implemented method of claim 15 wherein the output distribution of the autoregressive vocoder is a single Gaussian distribution.

17. The computer-implemented method of claim 15 wherein the loss further comprises a frame-level loss between output from the vocoder and corresponding ground-truth audio.

18. The computer-implemented method of claim 17 wherein the loss comprises a linear combination of average KL divergence and frame-level loss.

19. The computer-implemented method of claim 15 wherein the vocoder is a non-autoregressive model.

20. The computer-implemented method of claim 15 wherein the convolutional processing block is non-causal and applies a non-causal convolution to utilize future temporal information.

* * * * *